US007815176B2

(12) United States Patent
McIntosh et al.

(10) Patent No.: US 7,815,176 B2
(45) Date of Patent: Oct. 19, 2010

(54) LOCK MECHANISM FOR PIN CLAMP ASSEMBLY

(75) Inventors: Bruce D. McIntosh, Monroeville, IN (US); Parag Patwardhan, Fort Wayne, IN (US); Kenneth A. Steele, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 433 days.

(21) Appl. No.: 11/528,304

(22) Filed: Sep. 27, 2006

(65) Prior Publication Data

US 2007/0069439 A1 Mar. 29, 2007

(51) Int. Cl.
*B23Q 3/08* (2006.01)

(52) U.S. Cl. .......................... 269/32; 269/27; 269/229; 269/231

(58) Field of Classification Search .................. 269/32, 269/27, 229, 231, 24, 20
See application file for complete search history.

(56) References Cited

U.S. PATENT DOCUMENTS 2,664,073 A * 12/1953 Pine ......................... 254/93 H
2,845,847 A 8/1958 Blatt et al.
3,273,878 A 9/1966 Blatt
3,362,703 A 1/1968 Blatt
3,371,923 A 3/1968 Blatt
3,436,072 A 4/1969 Svenson
3,442,291 A 5/1969 Carls
3,454,971 A 7/1969 Wolf
3,482,830 A 12/1969 Sendoykas
3,482,831 A 12/1969 Blatt
3,567,208 A 3/1971 Blatt
3,570,835 A 3/1971 McPherson
3,618,931 A 11/1971 Blatt
3,635,514 A 1/1972 Blatt
3,702,185 A 11/1972 Blatt
3,757,963 A 9/1973 Binkley
3,794,265 A 2/1974 Jantzen
3,806,140 A 4/1974 Robertson
3,812,766 A 5/1974 Weiss
4,021,027 A 5/1977 Blatt (Continued)

FOREIGN PATENT DOCUMENTS

DE 4020981 A1 7/1990

(Continued)

OTHER PUBLICATIONS

COMAU/PICO PC516 Pin Clamp Locator; Catalog Drawing Sht #1 as of Jan. 15, 2003.

(Continued)

*Primary Examiner*—Lee D Wilson
(74) *Attorney, Agent, or Firm*—Barnes & Thornburg LLP

(57) ABSTRACT

A pin clamp assembly is provided. The assembly includes a housing, a locating pin, a body, and first and second locks. The locating pin extends from the housing. The body extends from the locating pin. At least a portion of the body is located interior of the housing. The body and locating pin are movable with respect to the housing. The first lock is located on the body and the second lock is configured to selectively couple with the first lock. Selective coupling of the locks prevent the body from moving.

3 Claims, 20 Drawing Sheets

U.S. PATENT DOCUMENTS

| | | | | |
|---|---|---|---|---|
| 4,203,582 | A | | 5/1980 | Hart et al. |
| 4,240,620 | A | | 12/1980 | Tünkers |
| 4,396,183 | A | | 8/1983 | Lymburner |
| 4,418,901 | A | * | 12/1983 | Woods et al. .............. 269/101 |
| 4,458,889 | A | | 7/1984 | McPherson et al. |
| 4,494,739 | A | | 1/1985 | Valentine |
| 4,496,138 | A | | 1/1985 | Blatt |
| 4,564,151 | A | | 1/1986 | Pali |
| 4,618,131 | A | | 10/1986 | Campisi et al. |
| 4,620,696 | A | | 11/1986 | Blatt |
| 4,723,767 | A | | 2/1988 | McPherson et al. |
| 4,827,835 | A | | 5/1989 | LaBair |
| 4,905,973 | A | | 3/1990 | Blatt |
| 4,909,130 | A | | 3/1990 | LaBair |
| 5,064,177 | A | | 11/1991 | Witt et al. |
| 5,067,606 | A | | 11/1991 | Schlatter et al. |
| 5,103,551 | A | | 4/1992 | Tamura et al. |
| 5,125,632 | A | | 6/1992 | Blatt et al. |
| 5,143,361 | A | | 9/1992 | McNamara et al. |
| 5,147,091 | A | | 9/1992 | Yonezawa et al. |
| 5,165,670 | A | | 11/1992 | Sawdon |
| 5,171,001 | A | | 12/1992 | Sawdon |
| 5,215,295 | A | | 6/1993 | Hoover |
| 5,257,774 | A | | 11/1993 | Dykstra |
| 5,271,651 | A | | 12/1993 | Blatt et al. |
| 5,303,908 | A | | 4/1994 | Halder |
| 5,350,163 | A | | 9/1994 | Lichtenberg |
| 5,440,968 | A | | 8/1995 | Sekine |
| 5,460,358 | A | | 10/1995 | Sendoykas |
| 5,490,663 | A | | 2/1996 | Stojkovic et al. |
| 5,575,462 | A | | 11/1996 | Blatt |
| 5,634,629 | A | | 6/1997 | Blatt |
| 5,657,972 | A | | 8/1997 | Blatt |
| 5,676,357 | A | | 10/1997 | Horn |
| 5,687,961 | A | | 11/1997 | Horn |
| 5,697,752 | A | | 12/1997 | Dugas et al. |
| 5,704,600 | A | | 1/1998 | Robinson |
| 5,762,325 | A | | 6/1998 | Blatt |
| 5,799,932 | A | | 9/1998 | Blatt |
| 5,816,567 | A | | 10/1998 | Horn |
| 5,823,519 | A | | 10/1998 | Tunkers |
| 5,845,897 | A | | 12/1998 | Tunkers |
| 5,845,898 | A | | 12/1998 | Halder et al. |
| 5,853,211 | A | | 12/1998 | Sawdon et al. |
| 5,871,250 | A | | 2/1999 | Sawdon |
| 5,884,903 | A | | 3/1999 | Sawdon |
| 5,938,257 | A | | 8/1999 | Blatt |
| 5,996,984 | A | | 12/1999 | Takahashi |
| 6,059,277 | A | | 5/2000 | Sawdon et al. |
| 6,065,743 | A | | 5/2000 | Roudier et al. |
| 6,070,864 | A | | 6/2000 | Crorey |
| 6,076,816 | A | | 6/2000 | Tünkers |
| 6,102,383 | A | | 8/2000 | Tünkers |
| 6,105,947 | A | | 8/2000 | Dykstra |
| 6,115,898 | A | | 9/2000 | Sawdon |
| 6,129,345 | A | | 10/2000 | Chiorino |
| 6,158,728 | A | | 12/2000 | Smith |
| 6,186,517 | B1 | | 2/2001 | De Bruyn et al. |
| 6,189,877 | B1 | | 2/2001 | Boris et al. |
| 6,199,846 | B1 | | 3/2001 | Crorey |
| 6,199,847 | B1 | | 3/2001 | Fukui |
| 6,199,873 | B1 | | 3/2001 | Roudier et al. |
| 6,206,353 | B1 | | 3/2001 | Becker et al. |
| 6,220,588 | B1 | | 4/2001 | Tünkers |
| 6,279,886 | B1 | | 8/2001 | Grossart |
| 6,279,887 | B1 | | 8/2001 | Glasenapp et al. |
| 6,338,476 | B1 | | 1/2002 | Takahashi |
| 6,354,580 | B1 | | 3/2002 | Nagai et al. |
| 6,357,735 | B2 | | 3/2002 | Haverinen |
| 6,362,547 | B1 | | 3/2002 | Peterson et al. |
| 6,364,300 | B1 | | 4/2002 | Kita |
| 6,364,301 | B1 | | 4/2002 | Takahashi |
| 6,364,302 | B2 | | 4/2002 | Ausilio |
| 6,378,855 | B1 | | 4/2002 | Sawdon et al. |
| 6,378,856 | B1 | | 4/2002 | Takahashi |
| 6,416,045 | B1 | | 7/2002 | Morroney |
| 6,422,549 | B2 | | 7/2002 | Crorey |
| 6,435,494 | B2 | | 8/2002 | Takahashi et al. |
| 6,439,560 | B2 | | 8/2002 | Sawada et al. |
| 6,449,851 | B1 | | 9/2002 | Bone et al. |
| 6,457,920 | B1 | | 10/2002 | Kleiner |
| 6,471,199 | B2 | | 10/2002 | Nagai et al. |
| 6,540,217 | B2 | | 4/2003 | Takahashi et al. |
| 6,557,840 | B2 | | 5/2003 | Sawdon |
| 6,557,841 | B2 | | 5/2003 | Dellach et al. |
| 6,565,074 | B1 | | 5/2003 | Wheeler |
| 6,585,246 | B2 | | 7/2003 | McCormick et al. |
| 6,612,557 | B2 | | 9/2003 | Sawdon et al. |
| 6,616,133 | B1 | | 9/2003 | Wheeler et al. |
| 6,641,123 | B2 | | 11/2003 | Takahashi |
| 6,644,638 | B1 | | 11/2003 | McCormick |
| 6,648,316 | B1 | | 11/2003 | Vouland |
| 6,648,317 | B2 | | 11/2003 | Takahashi et al. |
| 6,655,673 | B2 | | 12/2003 | Colby |
| 6,666,489 | B2 | | 12/2003 | Kruger |
| 6,685,177 | B2 | | 2/2004 | Dugas et al. |
| 6,695,359 | B2 | | 2/2004 | Morel et al. |
| 6,698,736 | B2 | | 3/2004 | Dugas et al. |
| 6,719,281 | B2 | | 4/2004 | Kohlert |
| 6,727,194 | B2 | | 4/2004 | Yoo |
| 6,733,271 | B2 | | 5/2004 | De Nichilo |
| 6,736,385 | B1 | | 5/2004 | Beffrieu |
| 6,739,587 | B2 | | 5/2004 | Migliori |
| 6,786,478 | B2 | | 9/2004 | Pavlik et al. |
| 6,814,349 | B2 | | 11/2004 | Migliori |
| 6,845,975 | B2 | | 1/2005 | Tünkers |
| 6,869,068 | B2 | | 3/2005 | Zhao et al. |
| 6,877,730 | B2 | | 4/2005 | Sawdon et al. |
| 6,880,816 | B1 | | 4/2005 | Wheeler et al. |
| 6,883,795 | B2 | | 4/2005 | McCormick et al. |
| 6,902,159 | B2 | | 6/2005 | Sawdon et al. |
| 6,902,160 | B1 | | 6/2005 | Zajac, Jr. et al. |
| 6,908,077 | B2 | | 6/2005 | Sawdon |
| 6,913,254 | B2 | | 7/2005 | Pavlik et al. |
| 6,931,980 | B1 | | 8/2005 | Zajac Jr. et al. |
| 6,976,671 | B2 | | 12/2005 | Migliori |
| 6,997,447 | B2 | | 2/2006 | Fukui |
| 7,000,911 | B2 | | 2/2006 | McCormick et al. |
| 7,007,938 | B2 | | 3/2006 | Nakata et al. |
| 7,017,895 | B2 | | 3/2006 | Sakamoto |
| 7,017,897 | B2 | | 3/2006 | Cheah |
| 7,021,687 | B2 | | 4/2006 | Moilanen et al. |
| 7,029,000 | B2 | | 4/2006 | Petit et al. |
| 7,036,808 | B2 | | 5/2006 | Cheah |
| 7,066,459 | B2 | | 6/2006 | Tunkers |
| 7,182,326 | B2 | * | 2/2007 | McIntosh et al. .............. 269/32 |
| 7,448,607 | B2 | * | 11/2008 | Steele et al. .................. 269/32 |
| 7,467,788 | B2 | * | 12/2008 | McIntosh et al. .............. 269/32 |
| 7,516,948 | B2 | * | 4/2009 | McIntosh et al. .............. 269/32 |
| 2002/0093131 | A1 | | 7/2002 | Dugas et al. |
| 2002/0100155 | A1 | | 8/2002 | Nakamura |
| 2004/0021260 | A1 | | 2/2004 | Migliori |
| 2004/0041323 | A1 | | 3/2004 | Migliori |
| 2004/0070130 | A1 | | 4/2004 | Pavlik et al. |
| 2004/0159996 | A1 | | 8/2004 | Migliori |
| 2004/0195747 | A1 | | 10/2004 | Migliori |
| 2004/0195750 | A1 | | 10/2004 | Migliori |
| 2004/0195751 | A1 | | 10/2004 | Migliori |
| 2004/0195752 | A1 | | 10/2004 | Migliori |
| 2005/0012258 | A1 | | 1/2005 | Migliori |
| 2005/0017423 | A1 | | 1/2005 | Kita et al. |
| 2005/0035515 | A1 | | 2/2005 | Hixon, Jr. et al. |
| 2005/0035516 | A1 | | 2/2005 | Sawdon et al. |
| 2005/0051939 | A1 | | 3/2005 | Beffrieu |

| | | | | |
|---|---|---|---|---|
| 2005/0121843 | A1 | 6/2005 | Maffeis | |
| 2005/0225017 | A1 | 10/2005 | Sakamoto | |
| 2005/0230893 | A1 | 10/2005 | Zajac et al. | |
| 2005/0242483 | A1* | 11/2005 | McIntosh et al. | 269/32 |
| 2005/0269755 | A1 | 12/2005 | Zhao et al. | |
| 2006/0049565 | A1 | 3/2006 | Petit et al. | |
| 2006/0103063 | A1 | 5/2006 | Liu et al. | |
| 2006/0125167 | A1 | 6/2006 | Steele et al. | |
| 2006/0163790 | A1 | 7/2006 | Xu et al. | |

FOREIGN PATENT DOCUMENTS

| | | | |
|---|---|---|---|
| DE | 4030730 | A1 | 9/1990 |
| DE | 10004506 | C1 | 2/2000 |
| EP | 0 256 208 | | 2/1988 |
| EP | 0322617 | A2 | 7/1989 |
| EP | 0 894 572 | A1 | 3/1999 |
| FR | 2755049 | A1 | 4/1998 |
| FR | 2837118 | A1 | 9/2003 |
| JP | 09 192968 | | 7/1997 |
| SU | 1593956 | A1 | 9/1990 |
| WO | WO 9635547 | A1 | 11/1996 |
| WO | WO 03/041913 | A1 | 5/2003 |

OTHER PUBLICATIONS

Internal mechanism of Pin Clamp locator.
International Search Report, Oct. 11, 2007.
International Search Report, Apr. 15, 2008.
International Search Report, May 20, 2008.

* cited by examiner

SECTION A-A

SECTION B-B 6
8
70
104
120
72
122
188
186
108
132
146
102
2
56
58
86
88

LOCK MECHANISM FOR PIN CLAMP ASSEMBLY

TECHNICAL FIELD

The present disclosure is generally related to gripper or clamp assemblies. More particularly, the present disclosure as related to pin clamp assemblies having a locking mechanism that selectively limits movement of the clamp's locating pin.

BACKGROUND AND SUMMARY

Pin clamps which use locating pins and movable fingers to engage and grip a workpiece are known. Characteristically, such pin clamps employ either a stationary or rectilinearly moving locating pin with [a] movable finger[s] located therein. Clamps having the rectilinearly movable locating pin extend the locating pin to engage a hole in a workpiece, such as a metal sheet. The locating pin then retracts and the finger or fingers within the locating pin extend and hold the workpiece against the clamp's body. In an operating environment, it would be useful to have a locking mechanism that can hold the movable locating pin. Under a loss of air pressure, for example, the locating pin would still hold the workpiece.

Accordingly, an embodiment of the present disclosure provides a pin clamp assembly which comprises a housing, a locating pin, a body, and first and second locks. The locating pin extends from the housing. The body extends from the locating pin. At least a portion of the body is located interior of the housing. The body and locating pin are movable with respect to the housing. The first lock is located on the body and the second lock is configured to selectively couple with the first lock. Selective coupling of the locks prevent the body from moving under a loss of actuation pressure.

In the above and other embodiments, the pin clamp assembly may further comprise: a rod that is movable upon initiation of an actuation force and that moves the body; the first lock being a hook that is coupled to the body; the second lock being a catch that couples with the hook; the second lock being selectively movable with respect to the housing; the catch being movable along a parallel path of movement with the body to allow the catch to couple with the hook at different locations; a bracket attached to the rod and moves with the rod to disengage the locks to allow the body to move; a bracket that moves to disengage the locks prior to the rod moving the body; a bracket attached to, and movable with, the rod, wherein the bracket comprises at least one surface that engages the hook to move the same from the catch as the rod moves, to allow the body to move; the hook further comprising at least one dowel that selectively engages the surface of the bracket oriented non-perpendicular to movement of the body to release the hook from the catch; and the catch further comprising an angled surface that is engagable by the hook but does not prevent the body from moving.

Another illustrative embodiment of the pin clamp assembly includes a movable locating pin and a lock assembly. The lock assembly comprises a hook and a latch that selectively engages and holds each other to restrict movement of the locating pin.

In the above and other embodiments, the pin clamp assembly may further comprise: a housing that receives a portion of the locating pin; the catch being selectively adjustable relative to the housing; the hook being pivotable relative to the locating pin; an actuator that moves the locating pin; and the locating pin being movable between extended and retracted positions, and wherein the lock assembly holds the locating pin in the retracted position.

A method of selectively holding and locking a workpiece with a locating pin clamp is also provided. The method comprising the steps of: providing a locating pin that engages a workpiece; retracting the locating pin; holding the workpiece with at least one finger extending from the locating pin; latching the locating pin by coupling a first hook associated with the locating pin with and a second hook to prevent release of the workpiece by the finger.

Additional features and advantages of the pin clamp assembly will become apparent to those skilled in the art upon consideration of the following detailed description of the illustrated embodiments exemplifying the best mode of carrying out the pin clamp assembly as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the pin clamp assembly, and such exemplification is not to be construed as limiting the scope of the pin clamp assembly in any manner.

DETAILED DESCRIPTION OF THE DRAWINGS

Figure 1:
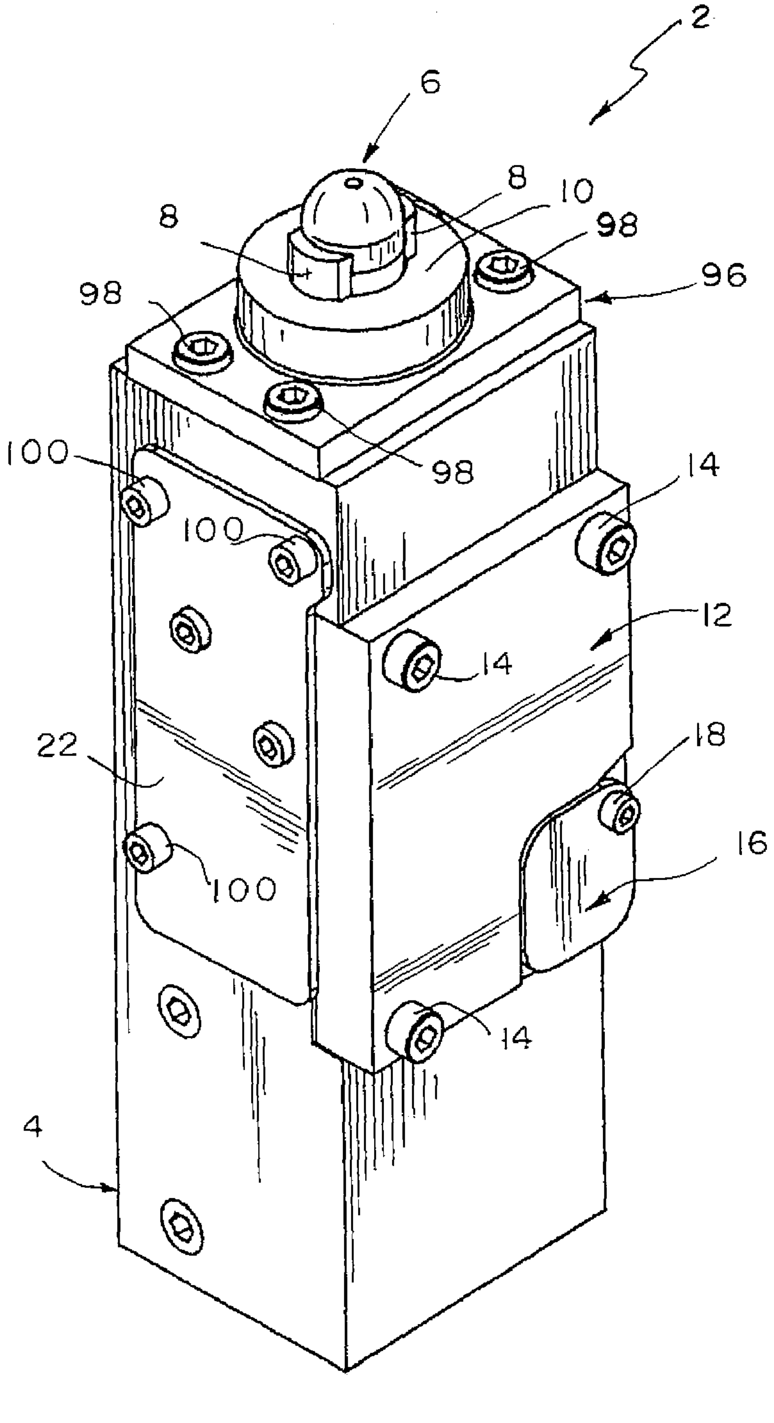
FIG. 1 is a perspective view of an illustrative embodiment of a pin clamp assembly.

A perspective view of an illustrative embodiment of a pin clamp assembly 2 is shown in FIG. 1. Pin clamp assembly 2 illustratively comprises a housing 4 with a locating pin 6 extending therefrom. Fingers 8 are configured to selectively extend and retract from locating pin 6. For example, when locating pin 6 is retracted (as shown), fingers 8 are moved to the extended or clamped position (also as shown). Conversely, when locating pin 6 is extended upwardly, fingers 8 are moved to the retracted or unclamped position. (See, e.g., FIG. 2*a*.) Accordingly, pin clamp assembly 2 has the ability to extend the locating pin 6 through a bore in a workpiece and then retract and use the fingers to hold the workpiece against plate surface 10. Also shown in this view is cover plate 12 illustratively attached to housing 4 via fasteners 14. This plate allows access to the interior of housing 4 without having to disassemble the entire pin clamp assembly 2. A secondary cover 16 is attached to cover plate 12 via fastener 18. This allows selective access to the interior of housing 4 as well. In one illustrative embodiment, the access is to manually unlock mechanism 20. (See e.g., FIGS. 11*a-c*.) This illustrative embodiment also comprises fluid ports (not shown) wherein pneumatic pressure is supplied to the fluid ports to actuate locating pin 6. It is appreciated that in alternative embodiments other actuation sources may be employed. For example, electrical power, or hydraulic fluid power, may be used in place of pneumatic power. Also shown in FIG. 1 is access plate 22 attached to housing 4 via fasteners 100. Illustratively, plate 22 provides access to internal components of the pin clamp assembly. Alternatively, plate 22 can be removed to allow other accessories to be attached and engage those internal components. (See, e.g., FIGS. 14-17.) Also, plate 22 may attach to cam member 26. (See e.g., FIG. 5.)

Figure 2A:
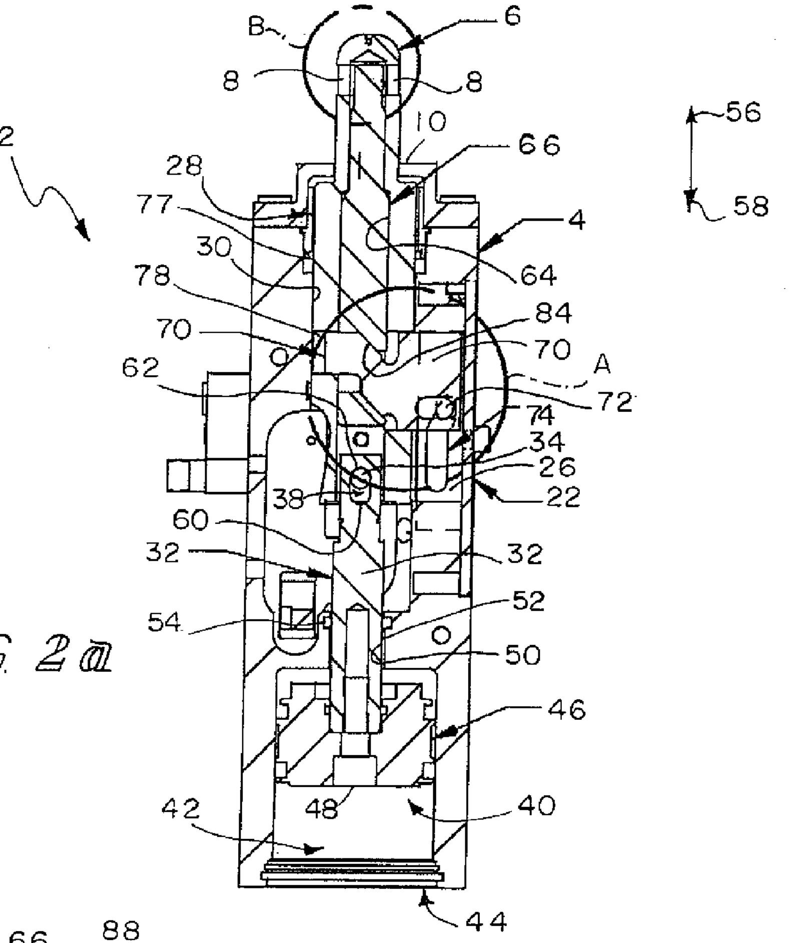
FIGS. 2*a-c* are side-cross-sectional detail views of the pin clamp assembly of FIG. 1, wherein its locating pin is located in an extended position.
Figure 2B:
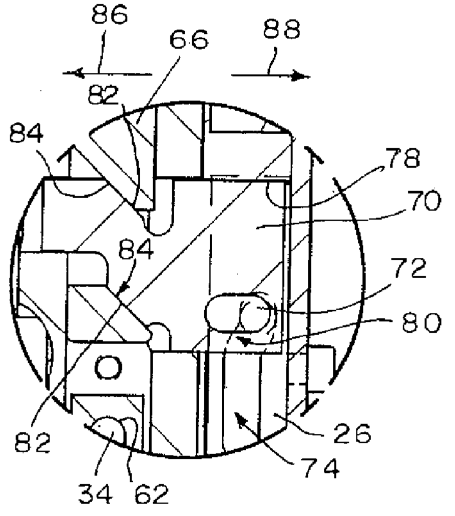
Figure 2C:
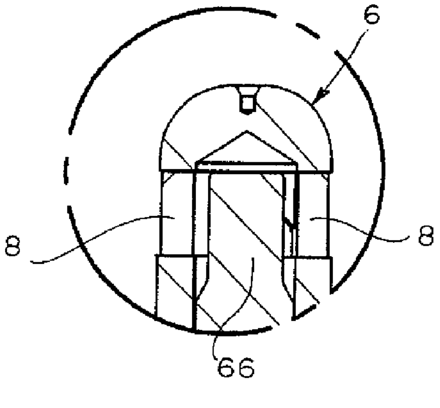

Side-cross-sectional and detail views of pin clamp assembly 2 are shown in FIGS. 2*a* through *c*. Specifically, as shown in FIG. 2*a*, locating pin 6 is shown extending from an opening 28 in housing 4. It is appreciated that in this view locating pin 6 is shown in an extended or typically unclamped position from housing 4. A portion of locating pin 6 is positioned in cavity 30 within housing 4. Fingers 8 shown in their retracted position are located adjacent the distal end of locating pin 6. Illustratively opposite fingers 8 is the attachment of piston rod 32 to locating pin 6. In one illustrative embodiment a pin 34 is disposed through a hole 36 in locating pin 6 (see also FIG. 5*a*) and through an opening or slot 38 disposed in piston rod 32 to hold the structures together. This piston rod 32 is connected to a pneumatic supply assembly 40 that is located within bore 42 of housing 4. Bore 42 is capped at the end by cap assembly 44 which may further comprise any appropriate retaining rings and/or seals. A piston 46 is attached to piston rod 32 illustratively via fastener 48. It is appreciated that the periphery of piston 46 may comprise any appropriate seals to prevent fluid transfer between opposed sections of bore 42. In this illustrative embodiment, piston rod 32 is disposed through bore 50 and extends into cavity 30. It is appreciated from this view that collar 52 which lines bore 50 may serve as a bearing surface for piston rod 32, as well as seal 54 which separates cavity 30 from bore 42. As shown in this illustrated embodiment, as piston moves in direction 56, piston rod 32 moves locating pin 6 in direction 56 as well. As piston 46 moves in direction 58, so too does locating pin 6. In one illustrative embodiment, to move locating pin 6 in direction 56 to an extended position, pin 34 engages end 60 of slot 38. Conversely, to move locating pin 6 in direction 58, piston 46 moves piston rod 32 and pin 34 engages end 62. It is contemplated in an illustrative embodiment slot 38 is provided to allow some independent movement between piston rod 32 and locating pin 6.

Located within a cavity 64 disposed in locating pin 6 is a driving member such as drive rod 66. Drive rod 66 illustratively comprises an angled slot 84 that is configured to receive a driver 70. In an illustrative embodiment, a portion of driver 70 is located in slot 78 which is disposed in locating pin 6. Driver 70 comprises a cam follower 72 that engages slot 74 of cam member 26. Also shown in this view is illustrative wiper seal 77 located within cavity 30 between the inner wall of housing 4 and locating pin 6.

The detail views A and B of FIGS. 2*b* and *c*, respectively, show an illustrative relationship between the position of driver 70 and the ultimate position of fingers 8 located at the distal end of locating pin 6. In the illustrative embodiment, considering the extension of locating pin 6 to be the beginning of the stroke, driver 70 is positioned illustratively to the far right side of slot 78 in direction 88. This lateral positioning of driver 70 may be dictated, at least in part, by the configuration of cam slot 74 of cam member 26. As shown in FIG. 2*b*, an illustrative jog 80 in cam slot 74 moves cam follower 72 in direction 88 drawing driver 70 with it. Driver 70 also illustratively comprises an angled portion that includes angled surfaces 82 that engage a corresponding angled slot 84 disposed in drive rod 66. As can be seen from the figure, when driver 70 is moved laterally with respect to the rectilinear movement of locating pin 6, the angled surfaces 82 disposed in angled slot 84 move drive rod 66 relative to locating pin 6. It is contemplated that in an illustrative embodiment, rectilinear movement of drive rod 66 can be independent of the movement of locating pin 6. The effect of this is that movement of drive rod 66 can move fingers 8 to extended or retracted positions without interfering with the movement of locating pin 6. The configuration of angled surfaces 82 of driver 70 causes drive pin 66 to be elevated which illustratively causes fingers 8 to be located in a retracted position, as shown in FIG. 2*c*.

Figure 3A:
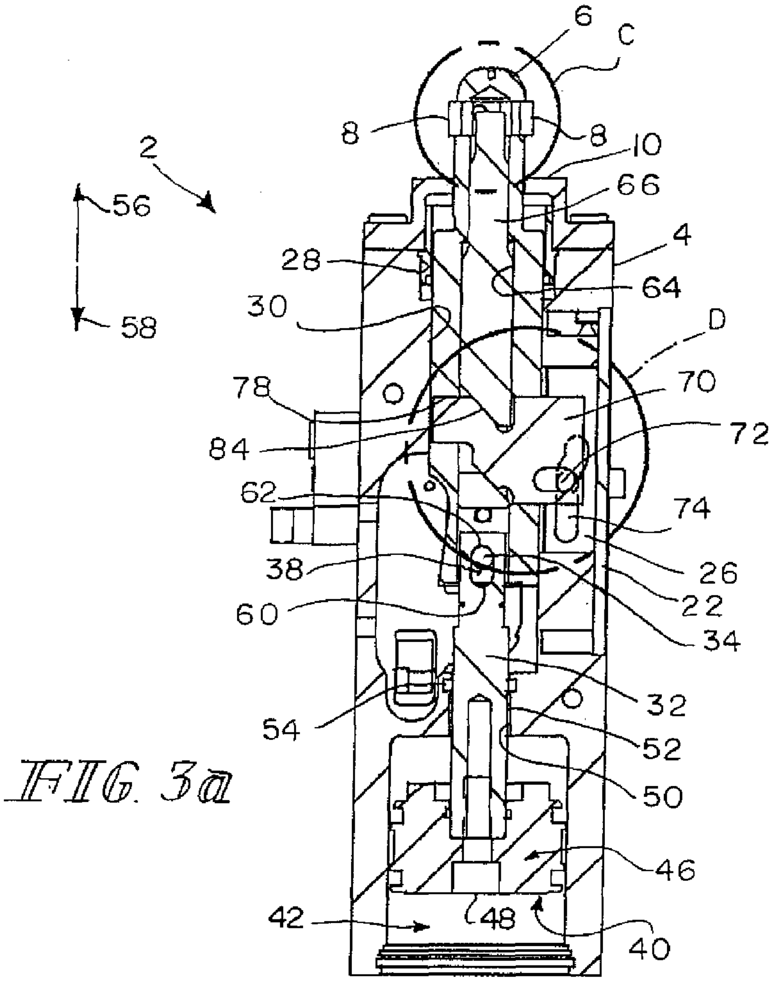
FIGS. 3*a-c* are side-cross-sectional and detail views of the pin clamp assembly of FIG. 1, wherein its locating pin is located in a partially retracted position.
Figure 3B:
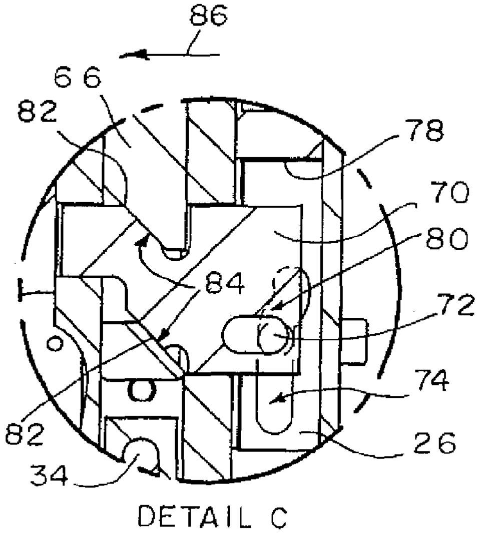
Figure 3C:
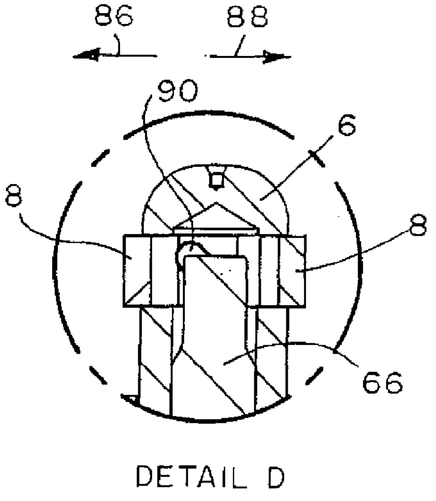

Side-cross-sectional and detail views of pin clamp assembly 2 are shown in FIGS. 3*a* through *c*. Specifically regarding FIG. 3*a*, this view is similar to that shown in FIG. 2*a* except that piston 46 of pneumatic supply assembly 40 is drawn downward in direction 58. As this occurs, piston rod 32 draws locating pin 6 in direction 58 as well, when pin 34 engages end 62 of slot 38. The resulting movement also moves driver 70 in direction 58. Consequently, cam follower 72 follows cam slot 74 which moves driver 70 in direction 86. Because angled surfaces 82 of driver 70 and slot 84 of drive rod 66 angle upward relative to direction 86, drive rod 66 is caused to move downward in direction 58. Because of the engagement between drive rod 66 and fingers 8, as drive rod 66 moves in direction 58, the fingers extend outwardly, illustratively in directions 86 and 88 to a clamping position. (See also FIGS. 8*a-c*.) As shown in detail view C of FIG. 3*b*, cam follower 72 of driver 70 follows cam slot 74 and specifically moves passed jog 80 which displaces driver 70 toward direction 86. Contrasting this view with detail A of FIG. 2*b*, it is evident that moving driver 70 farther in direction 86 within slot 78, allows drive rod 66 to move farther down in direction 58 relative to driver 70. The effect of this movement is evident in detail D of FIG. 3*c* where fingers 8 become spread apart. A partial view of slot 90 disposed in fingers 8 is keyed to a key 92 (see FIGS. 8*a-c*) which causes the fingers to spread in directions 86 and 88 as drive rod 66 is moved downward. It is appreciated that in other embodiments, the configuration of the key and slots can be modified so the fingers will move as desired in response to specific movement of drive rod 66.

Figure 4A:
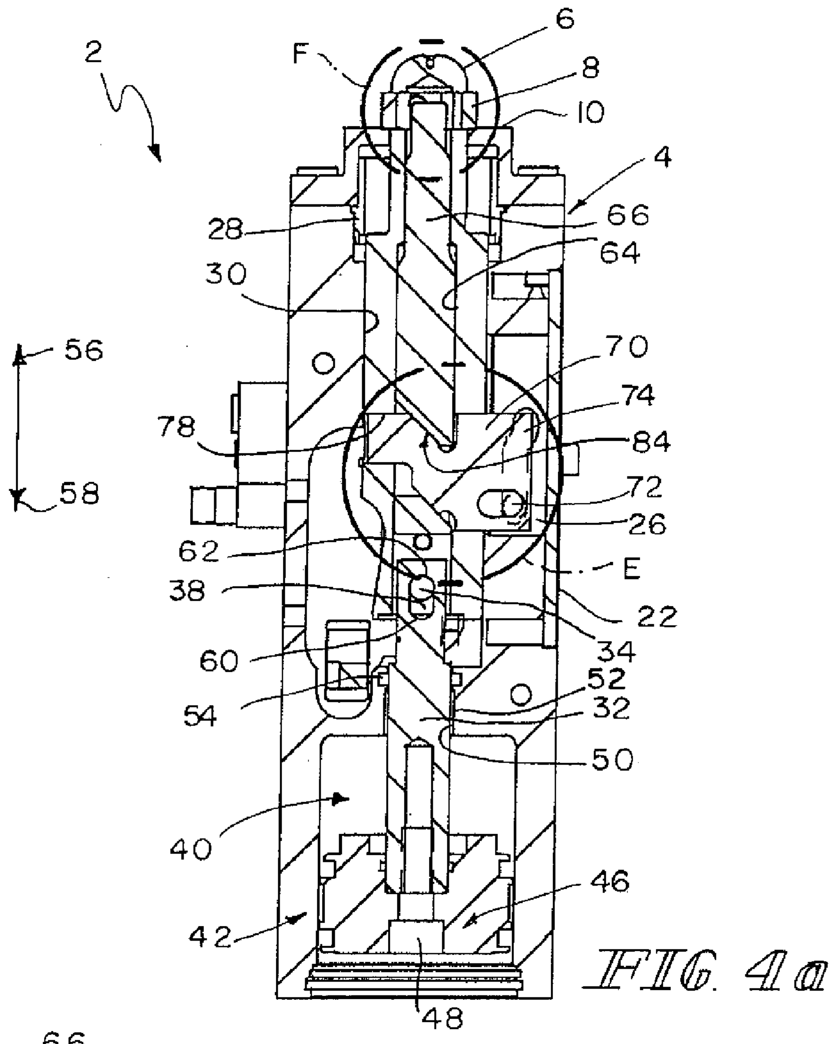
FIGS. 4*a-c* are side-cross-sectional and detail views of the pin clamp assembly of FIG. 1, wherein its locating pin is located in a retracted position.
Figure 4B:
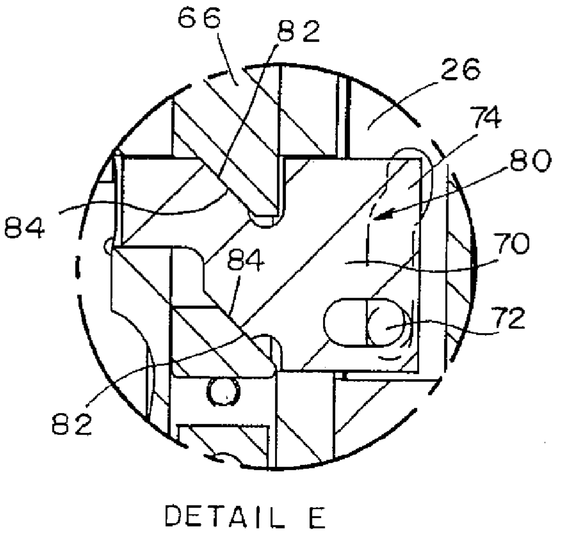
Figure 4C:
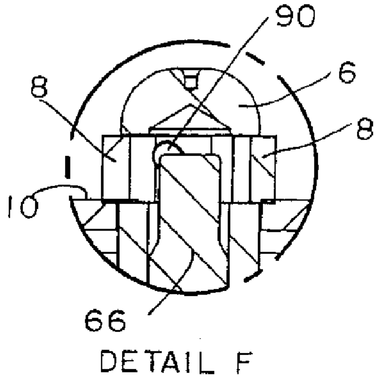

Side-cross-sectional and detail views of pin clamp assembly 2 are shown in FIGS. 4*a-c*. These views are similar to that of FIGS. 2 and 3 with the exception of locating pin 6 moved to the retracted position in direction 58, and the resulting jog of cam follower 72 in slot 74. For example, as shown in FIG. 4*a*, piston 46 moves locating pin 6 further in direction 58. As was the case in FIG. 3, fingers 8 shown in this view are extended and available to engage a workpiece against plate surface 10, for example. Also shown in this view is piston rod 32 engaging end 62 of slot 38 to draw locating pin 6 downward in direction 58. It is contemplated that continued force against piston 46 can maintain locating pin 6 and fingers 8 in the position shown. Specifically regarding detail E of FIG. 4*b*, cam follower 72 is shown to be illustratively moved to its fullest extent within cam slot 74 in direction 58. This maintains the relative downward positioning of drive rod 66 relative to driver 70 which maintains the extension of fingers 8 to the clamp position as shown in detail F of FIG. 4*c*. It is appreciated that the progression shown in FIGS. 2-4 constitutes a stroke of the pin clamp assembly 2. It is contemplated that movement of piston 46 in the opposite direction, direction 56, the structures described herein will move in essentially opposite fashion to extend locating pin 6 upward, which moves driver 70 upward so cam follower 72 traverses jog 80 in cam slot 74. The angled surfaces 82 and slot 84 will draw drive rod 66 upward in direction 56 (while moving driver 70 in direction 88), which based on its engagement with fingers 8 will retract the same to an unclamped position as originally shown in FIG. 2*a*.

Figure 5A:
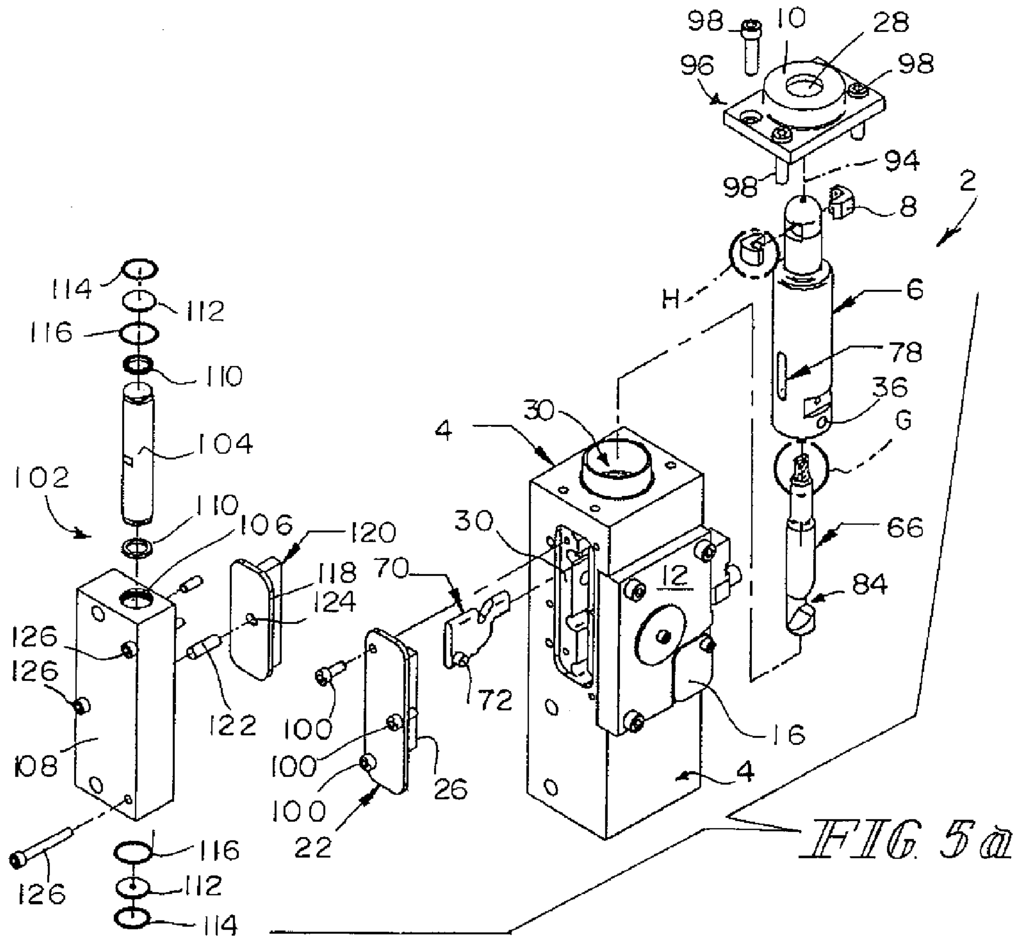
FIGS. 5*a-c* are perspective-exploded and detail views of an illustrative pin clamp assembly.
Figure 5B:
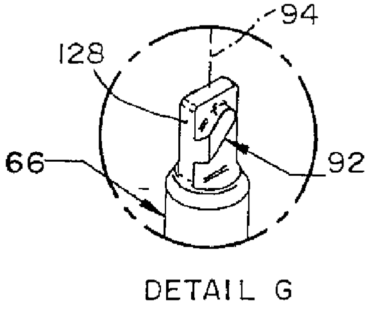
Figure 5C:
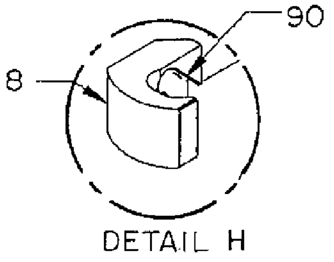

Perspective-exploded and detail views of illustrative pin clamp assembly 2 are shown in FIGS. 5*a-c*. As shown in FIG. 5*a*, housing 4 is configured to receive locating pin 6 and drive rod 66 within cavity 30. A longitudinal axis 94 is shown disposed through locating pin 6 and drive rod 66. As previously discussed, drive rod 66 is configured to be inserted into locating pin 6. Plate surface 10 is shown to be part of sleeve 96 that is attached to housing 4 via fasteners 98. It is contemplated that longitudinal axis 94 illustratively extends through opening 28 disposed in sleeve 96. Also shown in this view is slot 78 disposed through locating pin 6 and configured to receive driver 70, and slot 84 disposed in drive rod 66 receives the angled surfaces 82 of driver 70. Also shown in this view is driver 70 with cam follower 72 extending therefrom and configured to be located within cavity 30 of housing 4. It is also appreciated how cam member 26 along with access plate 22 can be attached to housing 4 via fasteners 100. It is contemplated that in additional embodiments, access plate 22 and/or cam member 26 can be selectively replaced with an alternative accessory. For example, also shown in this view is strip-off cylinder assembly 102. (See also FIGS. 15-17.) As further discussed herein, strip-off cylinder assembly 102 can move the fingers as desired while locating pin 6 is moved to either its extended or retracted position relative to housing 4. What is shown in FIG. 5*a* specifically, is an illustrative piston 104 located within a cavity 106 of strip-off housing 108. Piston 104 is configured to move rectilinearly within housing 108. Various seals 110 border the periphery of piston 104. Caps 112 along with retaining rings 114 and seals 116 caps cavity 106 of housing 108. A modified access plate 118 and cam member 120 can be located on housing 4 similar to that described with regard to access plate 22 and cam member 26. Illustratively a pin 122 is configured to be disposed within an opening 124 of access plate 118 to allow engagement of pin 122 within cavity 30 of housing 4, as described and illustratively characterized further herein. Fasteners 126 attach housing 108 along with access plate 118 and cam member 120 onto housing 4 similar to that previously discussed with regard to access plate 22 and cam member 26.

The detail views G and H of FIGS. 5*b* and *c* show an illustrative configuration of drive rod 66 and fingers 8. In this illustrative embodiment, as shown in detail G of FIG. 5*b*, the distal end of drive rod 66 illustratively comprises a tang 128 that has an illustrative angled key 92 extending therefrom. Finger 8, as shown in detail H of FIG. 5*c*, has an angled slot 90 disposed therein configured to receive angled key 92. It is appreciated that both sides of tang 128 may have such an angled key 92 and, furthermore, the keys may be configured to be angled in opposed directions (see also FIG. 8*a*). It is appreciated from this and other views that keys 92 are angled with respect to longitudinal axis 94, so that as drive rod 66 moves rectilinearly along longitudinal axis 94, keys 92 can move the fingers 8 laterally with respect to that longitudinal axis. It can be further appreciated that providing structures at such an angle with respect to a particular axis can be used to translate movement laterally to that axis. In other words, such angled bodies can facilitate movement in both X and Y directions. (See, FIG. 8.)

Figure 6B:
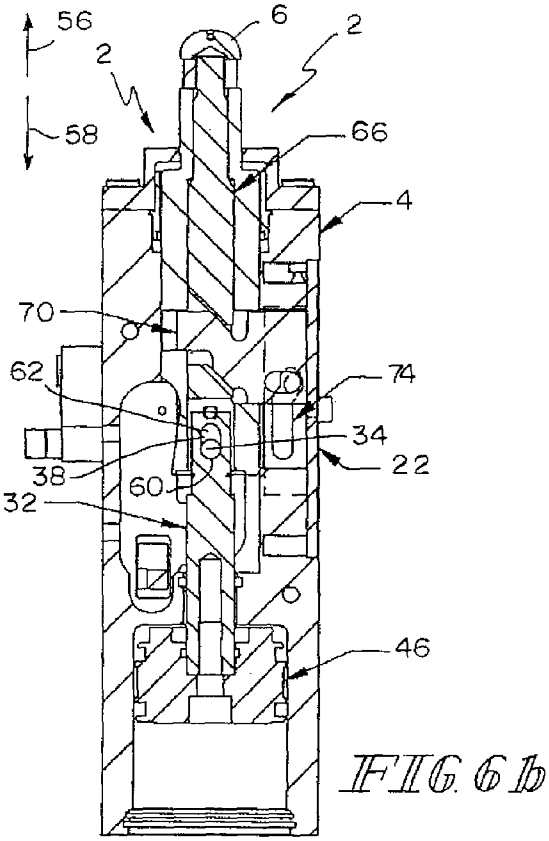
FIGS. 6*a-c* are end and side-cross-sectional views of a pin clamp assembly, wherein the sectional views of FIGS. 6*b* and *c* are taken along section lines A-A and B-B, respectively, of FIG. 6*a;*
Figure 6A:
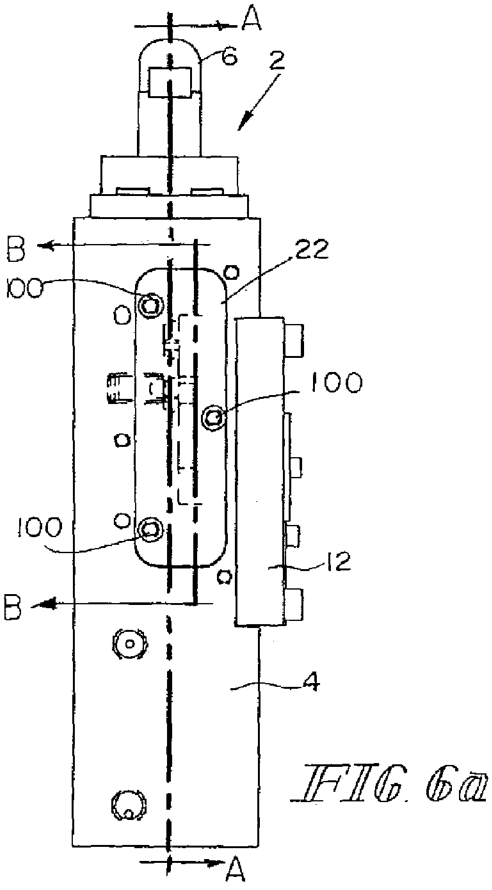
Figure 6C:
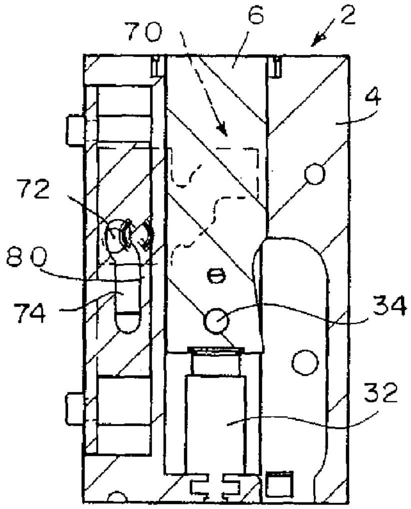

End and side-cross-sectional views of pin clamp assembly 2 are shown in FIGS. 6*a-c*. The section views of FIGS. 6*b* and *c* of pin clamp assembly 2 were taken along lines A-A and B-B, respectively, as shown in the end view of clamp assembly 2 in FIG. 6*a*. The sectional view shown in FIG. 6*b* is similar to that shown in FIGS. 2-4 except that here, end 60 of slot 38 engages pin 34. This is illustratively the effect of piston 46 moving locating pin 6 upward in direction 56 to extend locating pin 6. The sectional view of FIG. 6*c* is a reverse-angled detail view of locating pin 6 that includes driver 70 and shows the interaction between cam follower 72 and cam slot 74.

Figures 7A, 7B, 8A, 8B, 8C:
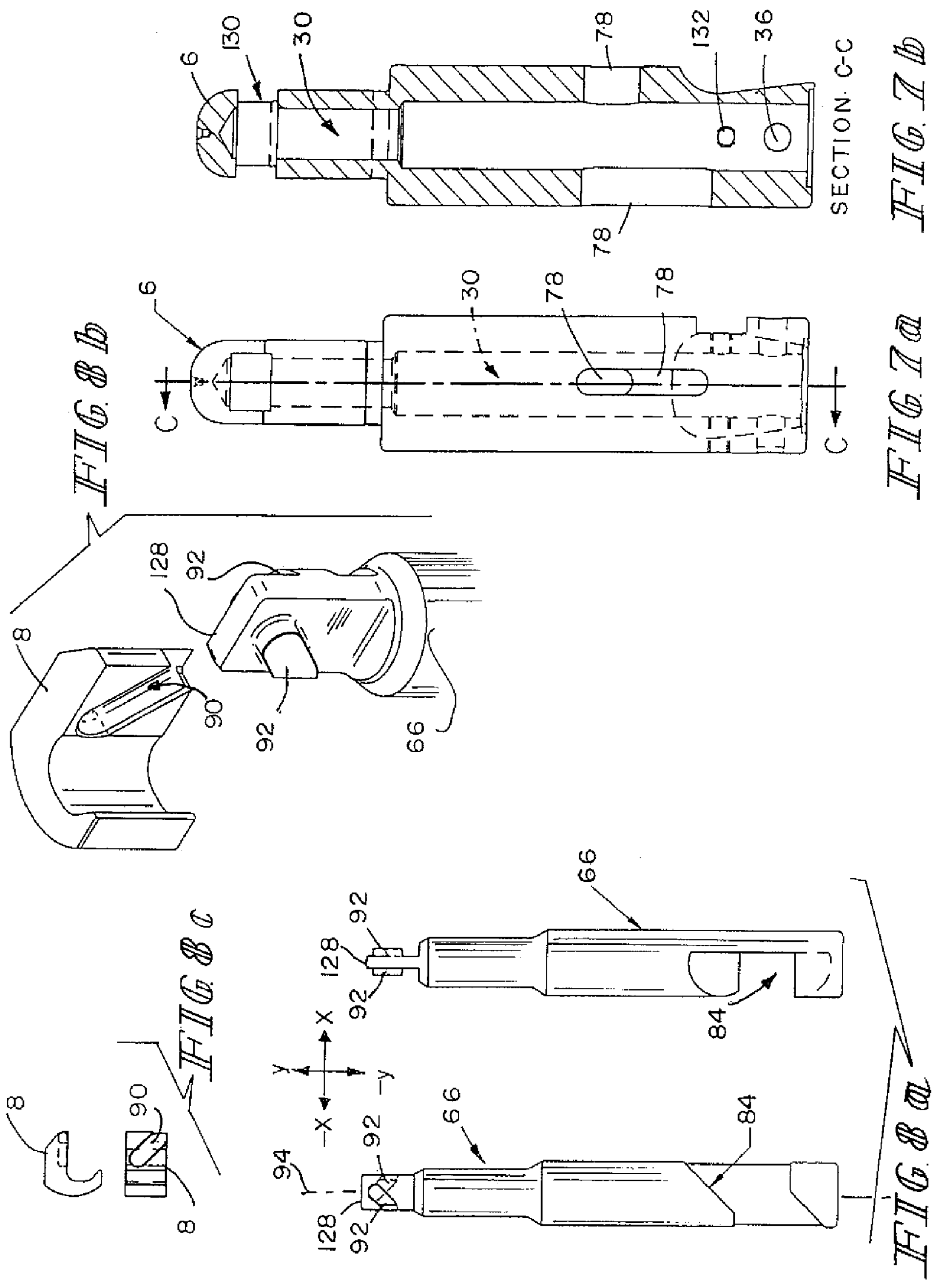
FIGS. 7*a* and *b* are side-elevational and cross-sectional views of an illustrative embodiment of a locating pin, wherein the cross-section shown in FIG. 7*b* is taken from lines C-C of FIG. 7*a;*
FIGS. 8*a-c* are end and side-elevational, perspective-exploded, and side and top views of an illustrative embodiment of a drive rod and a finger, respectively.

Side-elevational and cross-sectional views of an illustrative embodiment of locating pin 6 is shown in FIGS. 7*a* and *b*. The cross-sectional view shown in FIG. 7*b* is taken along lines C-C of FIG. 7*a*. Illustratively, locating pin 6 comprises a recess 130 that is configured to receive tang 128 of drive rod 66, as well as fingers 8. This recess leads into cavity 30 disposed within locating pin 6 which receives drive rod 66. Slot 78 is shown disposed through locating pin 6 traversing cavity 30 and extending out the periphery of locating pin 6 at opposed ends. Slot 78 also illustratively varies at each end of locating pin 6. This configuration is illustrative to accommodate the configuration of driver 70. It is appreciated, however, that the configuration of slot 78 can vary to accommodate a driver of alternate configuration. Also shown in this view is bore 36 that receives pin 34 and bore 132 that is configured to receive a fastener for an illustrative spring holder that is used on the locking mechanism 20 discussed further herein. (See also FIG. 11.)

End and side-elevational, perspective-exploded and side and top views of illustrative embodiments of drive rod 60 and finger 8 are shown in FIGS. 8*a-c*. The views of drive rod 66 in FIG. 8*a* show the angle of slot 84 relative to the longitudinal axis 94. Similarly, angled keys 92 are located on each side of tang 128 as well. Also shown in this view is how keys 92 on each side of tang 128 are angularly oriented in opposite directions. For this illustrative embodiment, the two fingers 8 are configured to extend outwardly from locating pin 6 to assist clamping a workpiece. For example, as shown herein, drive rod 66 is moveable along the Y, −Y axis. Such angled keys 92 can typically provide a path in both X and Y directions. Here, one key 92 provides a path in the X, Y direction and the opposite key 92 provides a path in the Y, −X direction. Fingers 8, however, are confined from moving in the Y, −Y axis by the proximal end of locating pin 6. (See also FIG. 7.) Consequently, fingers 8 illustratively only move in either the X or −X direction, as shown in FIGS. 2-4. It can be appreciated, however, that alternate embodiments of the key can move the fingers in other directions.

The perspective-exploded view of drive rod 66 and finger 8 and FIG. 8*b*, depicts how the two structures will mate. In this case, slot 90 is engagable with key 92 on one side of tang 128. It is appreciated that the second finger 8 has a similar slot that engages key 92 on the other side of tang 128. Additional views of finger 8 are shown in FIG. 8*c*. It is appreciated that in other embodiments, finger or fingers 8 can be modified to move in a direction as desired, resulting from the rectilinear movement of drive rod 66.

Figure 9C:
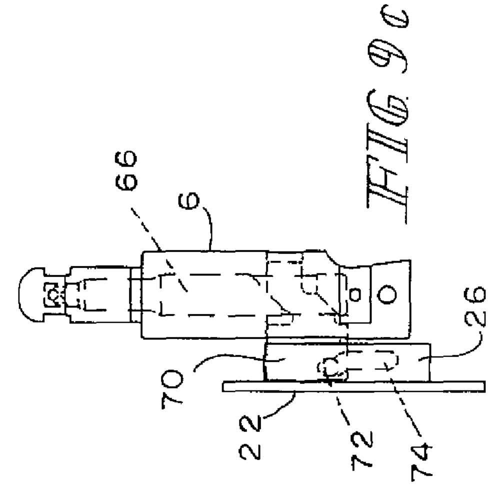
FIGS. 9*a-c* are side and end views of an illustrative embodiment of a driver, along with a detail view of the driver engaging a cam member, drive rod and locating pin.
Figure 9A:
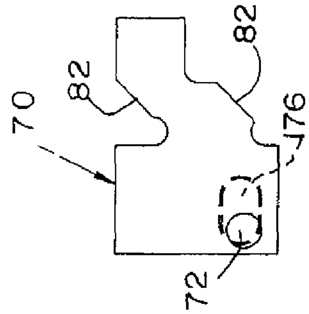
Figure 9B:
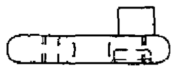

Side and end views of an illustrative embodiment of driver 70, along with an isolated detail view of driver 70 with locating pin 6, cam 26, and access plate 22 are shown in FIGS. 9*a-c*. The view of driver 70 in FIG. 9*a* shows an illustrative configuration that includes angled surfaces 82 that are configured to be received in slot 84 of drive rod 66. The end view of driver 70 shown in FIG. 9*b* also shows a profile view of cam follower 72. It is appreciated that alternative embodiments of driver 70 may include a cam follower of different configuration to follow a cam slot. And FIG. 9*c* shows an isolated side view of driver 70 and its associated structures including locating pin 6 and cam member 26.

Figure 10A:
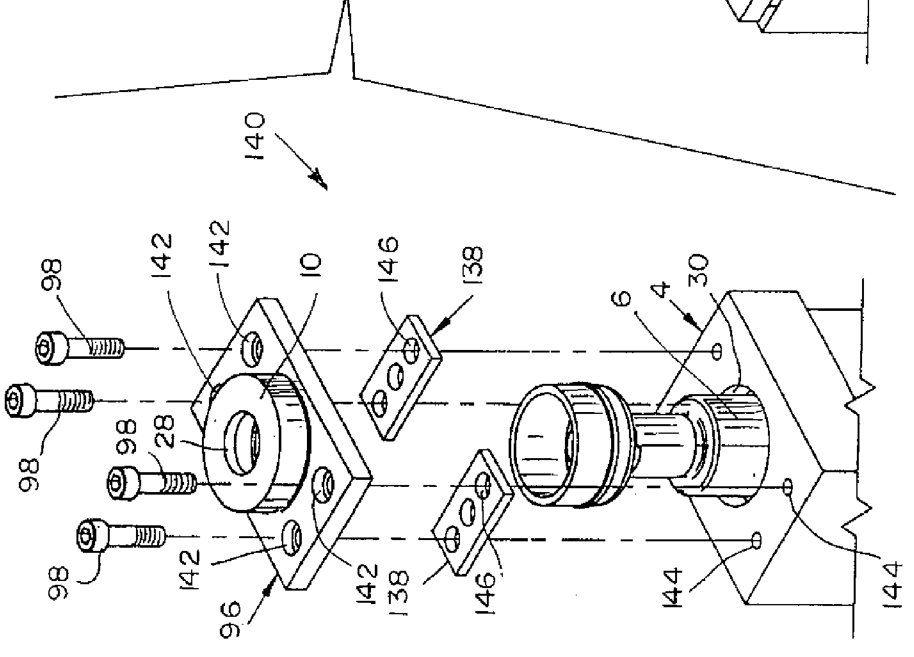
FIGS. 10*a-c* are exploded, perspective, and cross-sectional detail views of an illustrative embodiment of a shim and sleeve assembly.
Figure 10B:
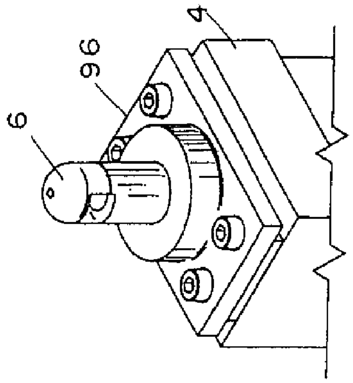
Figure 10C:
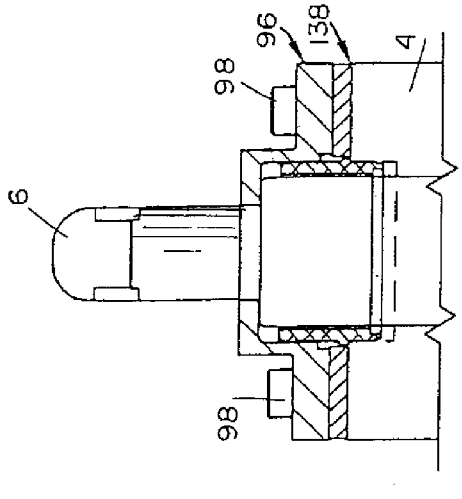

Exploded, perspective, and cross-sectional detailed views of an illustrative shim and sleeve assembly 140 are shown in FIGS. 10*a-c*, respectively. As shown in the exploded view of FIG. 10*a*, shim and sleeve assembly 140 comprises a sleeve 96 that is fastened to the top of housing 4 via fasteners 98 disposed through bores 142 and 144 of sleeve 96 and housing 4 respectively. In one illustrative embodiment, shims 138 include bores 146 disposed therethrough that also receive fasteners 98. Shims 138 can, thus, be sandwiched and secured between sleeve 96 and housing 4. It is appreciated, however, that the thickness of shims 138 can be any amount that is useful to provide a desirable amount of shrouding about locating pin 6. The perspective view of shim and sleeve assembly 140 is shown in FIG. 10*b*. This view shows how locating pin 6 extends from opening 28 of sleeve 96. The cross-sectional view of FIG. 10*c* further illustrates the utility of shims 138. As shown herein, shims 138 allow sleeve 96 to be adjusted upward or downward along locating pin 6. The use of such shims 138 means that the top surface of sleeve 96 may not require machining to obtain a desired amount of shrouding about locating pin 6.

Figure 11A:
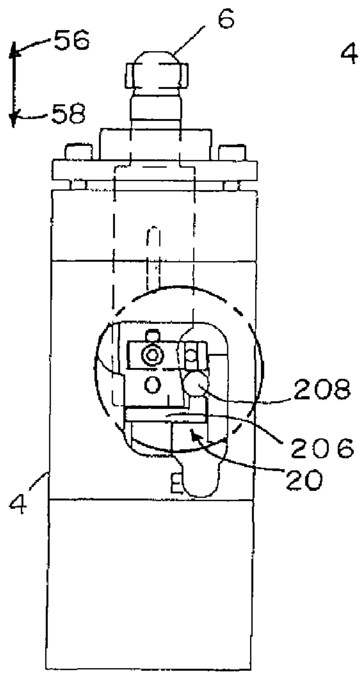
FIGS. 11*a-c* are side and detail views respectively, of a portion of the pin clamp assembly showing an illustrative embodiment of a locking mechanism.
Figure 11B:
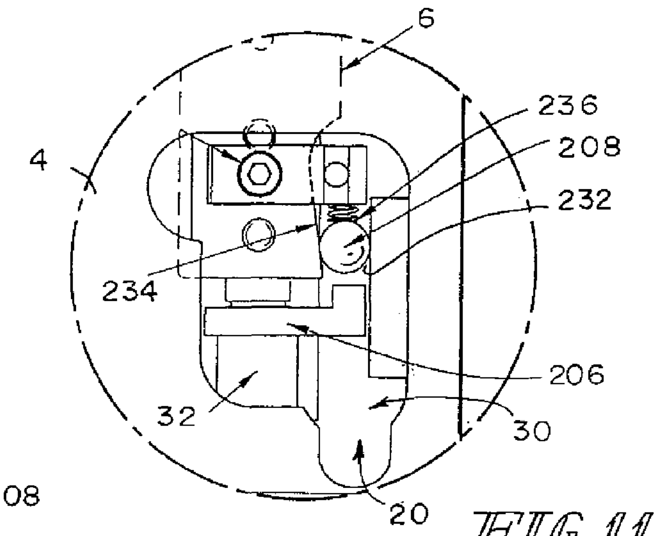
Figure 11C:
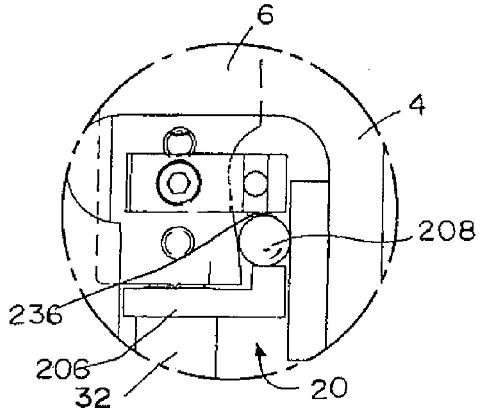

Side and detail views of locking/unlocking mechanism 20 of pin clamp 2 are shown in FIGS. 11*a-c*. As shown in FIGS. 11*a* and *b*, cavity 30 is formed in housing 4. Cavity 30 provides access to locating pin 6, as well as piston rod 32. In one illustrative embodiment, mechanism 20 is configured to be a locking mechanism. This can be particularly useful during loss of fluid power to clamp 2. Illustratively, when locating pin 6 is moved in the downward direction 58, the location of pin 208 with respect to the locating pin 6 is caused to be wedged between surfaces 232 and 234 by the bias created from spring 236. This wedging between the two surfaces prevents locating pin 6 from moving upwardly in direction 56. To unlock mechanism 20, as shown in FIG. 11*c*, lock release 206 or other structure or mechanism can push pin 208 upward unwedging pin 208 from between surfaces 234 and 232. The force of this upward movement should be greater than the downward bias of spring 236 to cause pin 208 to position itself in a nonwedging position between surfaces 234 and 232. The illustrative shape of cam surface 234 is such that in the lower position, that surface serves as a wedging surface, whereas farther upward thereon, it no longer possesses such wedging properties. Mechanism 20 can also be configured to manually move locating pin 6 upward in direction 56 to retract fingers 8 and allow release of any held workpiece. For example, when power is restored to clamp 2, the force of that power is sufficient to overcome the wedging force created by pin 208 and surfaces 232, 234. This is illustratively accomplished by the lock release 206 attached to piston rod 32 as shown in FIG. 5*c*. In this illustrative embodiment, slot 38 and piston rod 32 (see FIG. 2*a*) allow movement of piston rod 30 to some extent before it engages and moves locating pin 6. In this embodiment that extent of travel is enough to allow head 238 of lock release 206 to engage pin 208. Using the force of the traveling piston rod 30, pin 208 is pushed out of the way, thus, unwedging it from between surfaces 132 and 134 prior to piston rod 30's engagement and movement of locating pin 6. Once pin 208 is unwedged, locating pin 6 will be free to move upwardly in direction 56.

Figure 12B:
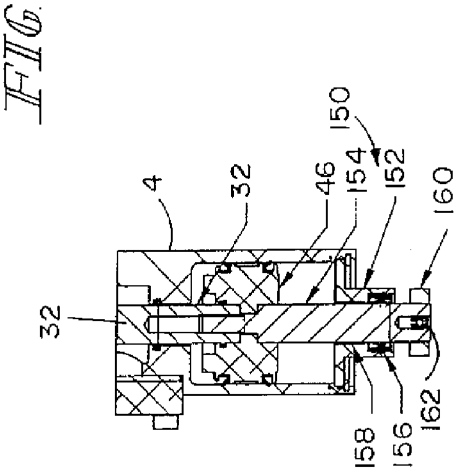
FIGS. 12*a* and *b* are side and detail-cross-sectional views of a pin clamp assembly, wherein the detail-cross-sectional view of FIG. 12*b* is taken along lines F-F of FIG. 12*a;*
Figure 12A:
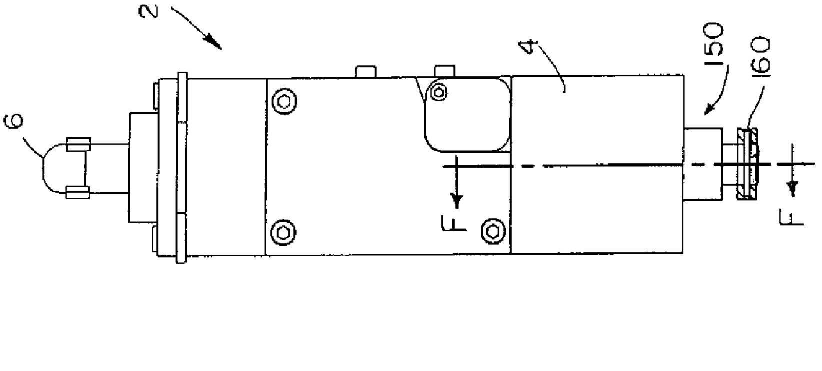

Side and detail-cross-sectional views of pin clamp assembly 2 are shown in FIGS. 12*a* and *b*. The section view shown in FIG. 12*b* was taken along lines F-F of FIG. 12*a*. In this illustrative embodiment, a location sensing flag 150 can be employed. Also in this illustrative embodiment, a standard bore plug at the end of the pin clamp assembly 2 can be replaced by a flag bore plug 152. A secondary piston rod 154 can then be attached to piston 46 and, illustratively, pass therethrough to thread or otherwise attach to piston rod 32. Plug 152 may illustratively comprise a rod wiper/seal 156, as well as a rod bearing 158 that receives secondary piston rod 154. A flag 160 is mounted to secondary piston rod 154, illustratively external of clamp body 4 and secured to rod 154 via spring pin 162. Flag 160 can be used as a target for a laser, optical, or other sensor, which detects when the clamp is in an extended or retracted position. It is appreciated that the configuration of assembly 150 shown is illustrative. It is contemplated that in alternate embodiments the flag can be of a shape or configuration useful for assisting and detecting the position of structures of pin clamp assembly 2.

Figure 13A:
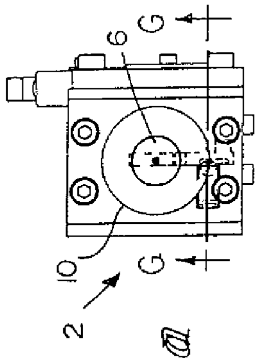
FIGS. 13*a-c* are top, side-cross-sectional, and detail views of a pin clamp assembly showing an illustrative embodiment of a detent assembly, wherein the cross-sectional and detail views of FIGS. 13*b* and *c* are taken along lines G-G of FIG. 13*a;*
Figure 13B:
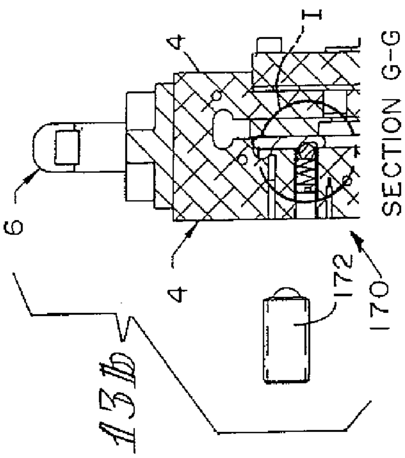
Figure 13C:
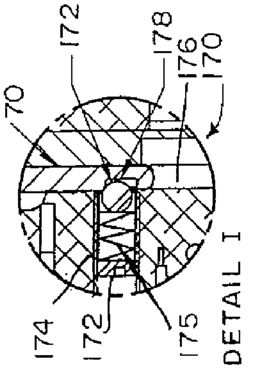

Top, side-cross-sectional, and detail views of clamp assembly 2 disclosing an illustrative embodiment of a detent assembly 170 is shown in FIGS. 13*a-c*. The cross-sectional view of pin clamp assembly 2 shown in FIG. 13*b* is taken along lines G-G of FIG. 13*a*, and the detail view of FIG. 13*c* is taken from detail I of the cross-sectional view of FIG. 13*b*. Detent assembly 170 can be used to prevent locating pin 6 from moving until some force of specified value causes it to be freed from the detent assembly. In this illustrative embodiment, a detent 172, such as a ball detent or other custom or commercially available detent can be located within a bore 174 disposed in housing 4. Bore 174 is in communication with a slot or other cavity 176. Ball detent 172 is engagable with driver 70 having a portion of the same located in slot 176. In an illustrative embodiment detent 172 engages a detent slot 178 or other similar formation in driver 70. Detent 172 is biased against driver 70 and is configured to engage slot 178 when driver 70 is located at a particular location along the stroke of locating pin 6. In one illustrative embodiment, such a location is where locating pin 6 is at full extension, as shown in FIG. 13*b*. It is appreciated, however, that such a slot 178 can be located anywhere along the stroke of locating pin 6. When detent 172 engages cavity 178, locating pin 6 is effectively locked into place. A force such as the fluid pressure acting on piston 46 may be used to overcome the bias force 175 from detent 172 against slot 178 to overcome the same and allow driver 70 and, thus, locating pin 6 to unlock.

Figure 14B:
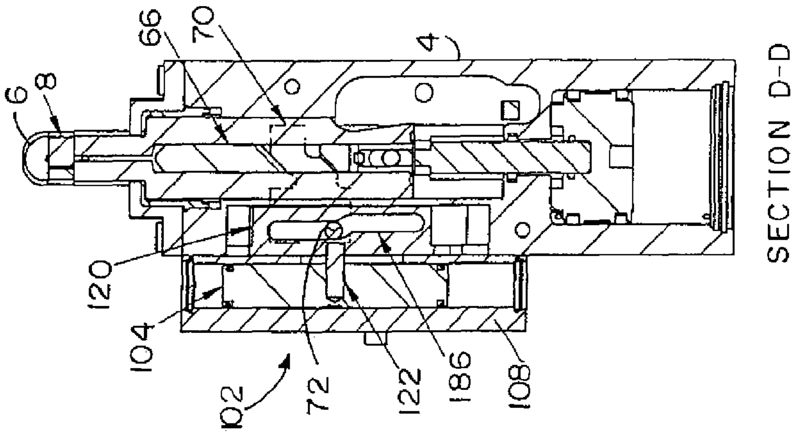
FIGS. 14*a* and *b* are front elevational and side-cross-sectional views of an illustrative pin clamp assembly, wherein the cross-sectional view of FIG. 14*b* is taken along lines D-D of FIG. 14*a;*
Figure 14A:
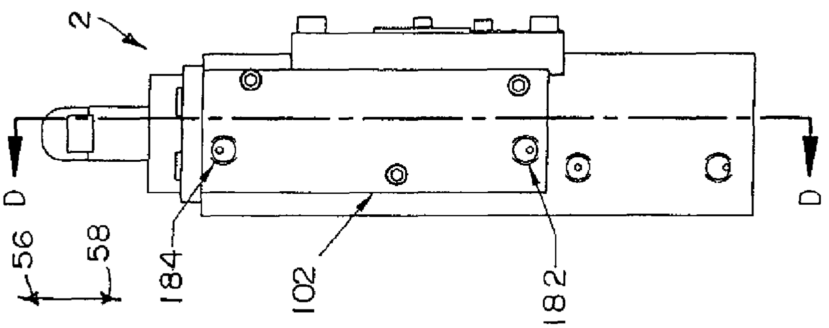

Front elevational and side-cross-sectional views of another illustrative embodiment of pin clamp assembly 2 are shown in FIGS. 14*a* and *b*. The cross-sectional view of pin clamp assembly 2 shown in FIG. 14 is taken along lines D-D of FIG. 14*a*. This illustrative embodiment includes strip-off cylinder assembly 102. In this illustrative embodiment, strip-off cylinder assembly 102 can move fingers 8 when locating pin 6 is located in either extended or retracted positions. Illustratively, as port 182 of strip-off cylinder housing 108 is pressurized, pin 122, coupled to cylinder piston 104, causes the cam member 120 to move upward in direction 56. This causes driver 70 to move, illustratively, in direction 88 in clamp housing 4. As this occurs, drive pin 66 is forced downward in direction 58 by means previously discussed. This motion causes fingers 8 to move out of locating pin 6, even when it is in the extended position. Conversely, when port 184 of strip-off cylinder housing 108 assembly is pressurized, cam member 120 is moved downward in direction 58. This causes driver 70 to move, illustratively, in direction 86. This causes drive pin 66 to move upward in direction 56 inside locating pin 6 which causes fingers 8 to retract, even if locating pin 6 is already in the retracted position. It is appreciated that the strip-off cylinder assembly 102 may cause movement of the fingers independent of movement of locating pin 6. For example, locating pin 6 may even be stationary during the movement of driver 70 when strip-off cylinder assembly 102 is activated. This allows control over extension or retraction of fingers 8 independent of the movement of locating pin 6. This can be useful in instances where sheet metal or other workpieces get bound-up or otherwise stuck on locating pin 6. It is further appreciated that cam follower 72 or driver 70 operates in cam path 186 similar to cam slot 74 in previous embodiments. (See, e.g., FIG. 2*a*.)

Figures 15A, 15B, 15C:
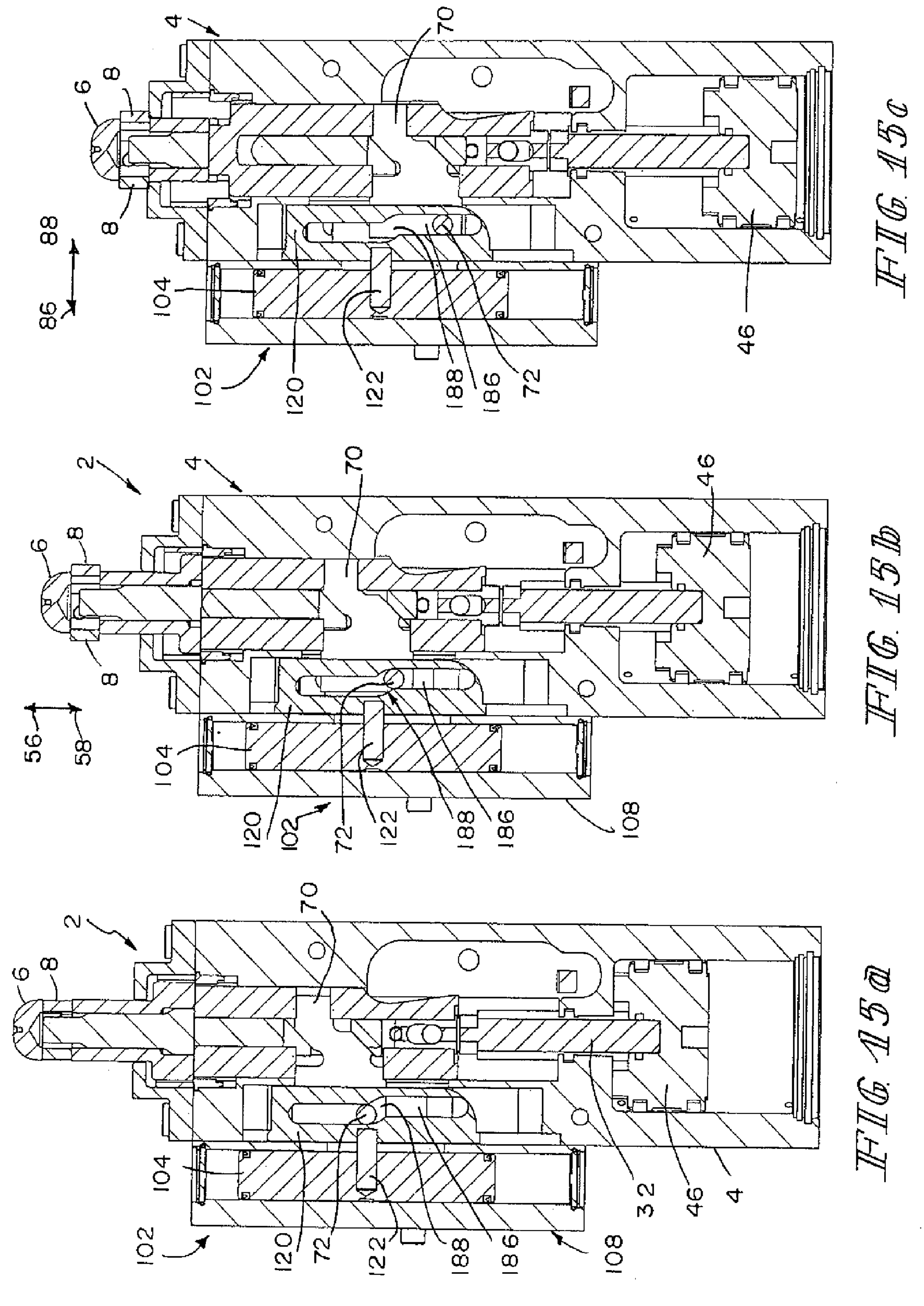
FIGS. 15*a-c* are cross-sectional views of a pin clamp assembly including an illustrative embodiment of a strip-off cylinder assembly, wherein the progression of movement shows the fingers extending as the locating pin retracts.
Figure 16C:
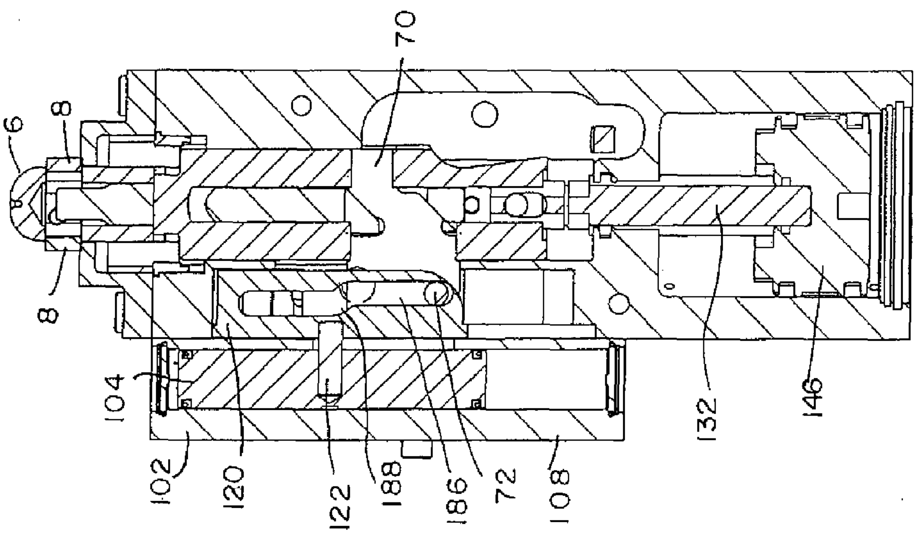
FIGS. 16*a-c* are cross-sectional views of a pin clamp assembly showing a progression view of the strip-off cylinder assembly of FIG. 15, wherein the fingers remain in an extended position during movement of the locating pin.
Figure 16B:
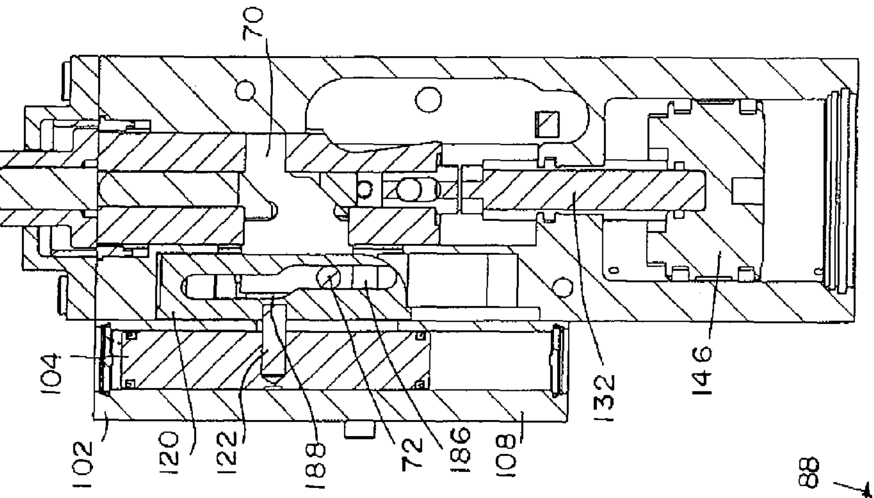
Figure 16A:
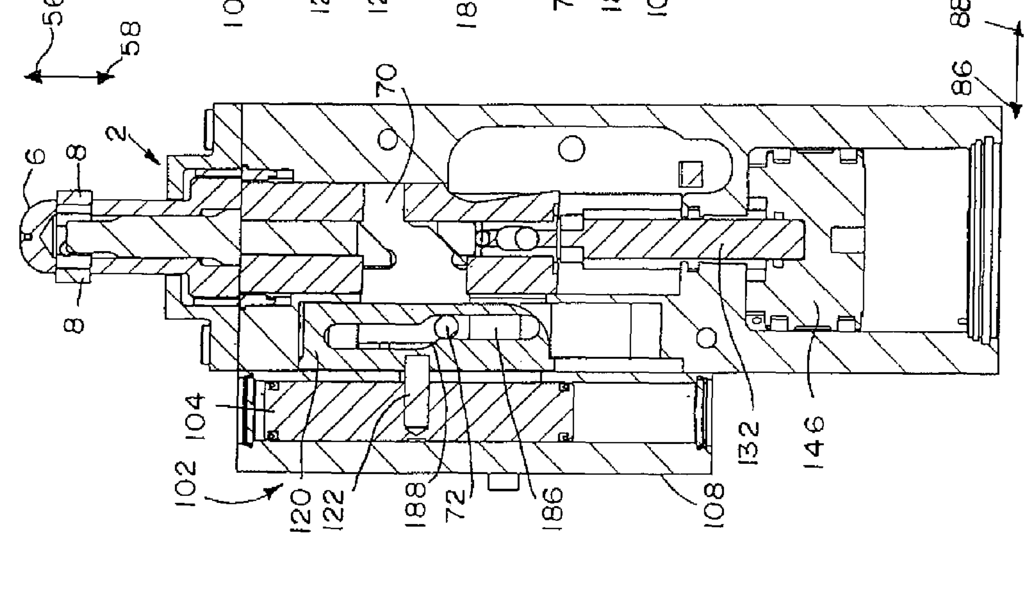
Figures 17A, 17B, 17C:
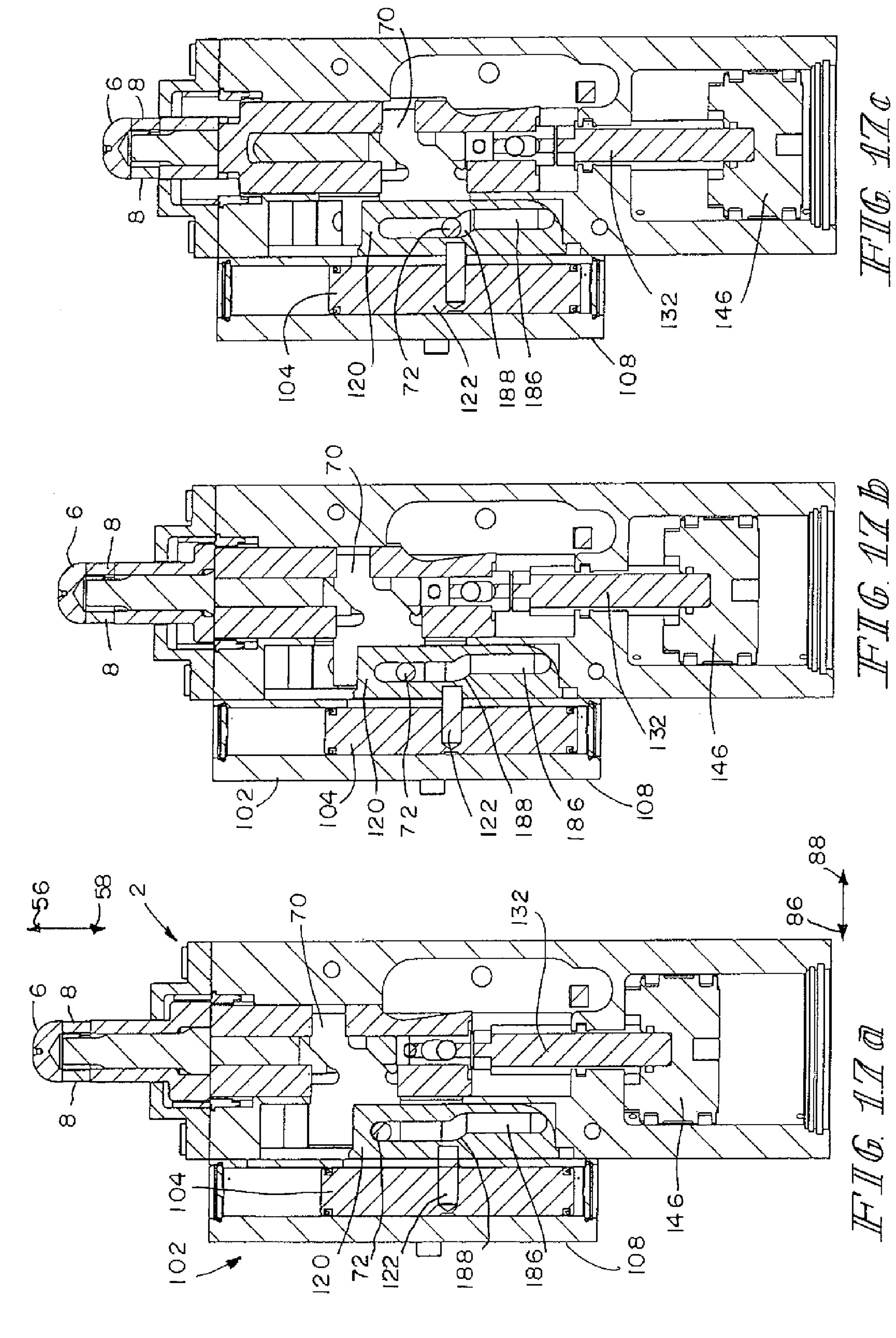
FIGS. 17*a-c* are cross-sectional views of a pin clamp assembly showing a progression view of the pin clamp assembly similar to FIGS. 15 and 16, but wherein the fingers remain retracted during movement of the locating pin.

Cross-sectional progression views of pin clamp assembly 2 with strip-off cylinder assembly 102 attached thereto is shown in FIGS. 15-17. These cross-sectional views of pin clamp assembly 2 are similar to those views shown in FIGS. 2-4, but at reverse angle. As shown in FIGS. 15*a-c*, during normal operation, as locating pin 6 retracts, actuation of piston 46 moves the same in direction 58. Fingers 8 extend as previously discussed with respect to FIGS. 2-4. The strip-off cylinder assembly 102 does not interfere with this operation. This is because the position of assembly 102 causes jog 188 located in cam slot 186 to be at about the same position as jog 80 is in cam slot 74 of the previous embodiments. In contrast, as shown in the progression view of FIGS. 16*a-c*, when piston 104 is moved in direction 56, cam member 120 is also moved in the same direction. This has the effect of moving jog 188 upward in direction 56 as well. This has the further effect of keeping driver 70 moved over in direction 88 during the entire stroke of locating pin 6. As this view shows, as piston 46 moves downward in direction 58, cam follower 72 has no opportunity to traverse jog 188 and move driver 70, and, thus, move drive rod 66 upward to retract fingers 8. Consequently, fingers 8 remain in the extended position for the length of the stroke. Conversely, as shown in the progression view of FIG. 17*a-c*, when piston 104 is moved downward in direction 58, as shown therein, so too does cam member 120. This has the opposite effect as that described with respect to FIGS. 16*a-c*. Particularly, cam follower 72 of driver 70 is maintained in the upper portion of cam slot 186 throughout the entire stroke of locating pin 6. The position of cam slot 186 does not allow cam follower 72 to traverse jog 188. Therefore, driver 70 is maintained toward direction 86 which maintains drive rod 66 in an upward position preventing fingers 8 from extending outward, regardless of the movement of either locating pin 6 or piston 46. This allows locating pin 6 to move as desired without having the fingers extend as well. It is appreciated that in an illustrative embodiment, access panel 118 is fixed to cam member 120 and moves therewith upon movement of pin 122 by piston 104.

Figures 18A, 18B, 18C, 18D:
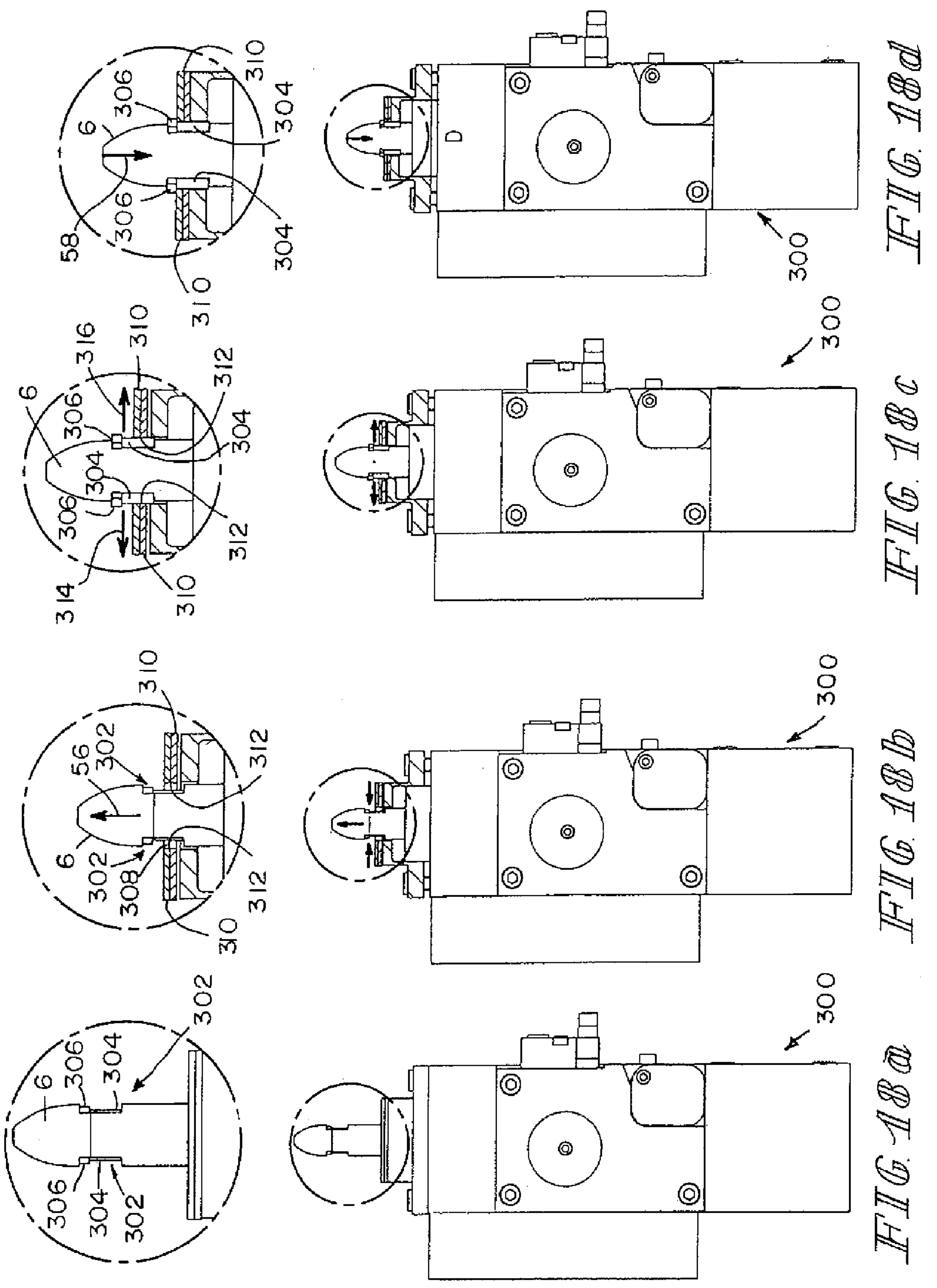
FIGS. 18*a-d* are side views along with corresponding detail views of an additional illustrative embodiment of a pin clamp assembly with an alternative finger configuration.

Side views of another embodiment of a pin clamp assembly 300, along with complimentary detail views, are shown in FIGS. 18*a-d*. The view of pin clamp assembly shown in FIG. 18*a* shows locating pin 6 moved in an illustrative full extension. This is typical of the pin clamp assembly according to the previous embodiments. However, the present embodiment includes split fingers 302. An illustrative purpose of these fingers is to assist centering a workpiece on the pin clamp and then clamping down on the workpiece. In an illustrative embodiment, split fingers 302 comprise a centering portion 304 and a clamping portion 306. As shown in the progression views of 18*b-d*, once locating pin is extended through a hole or cavity in the workpiece, centering portion 304 ensures the workpiece is centered on locating pin 6 and then clamped to hold into place. For example, as shown in FIG. 18*b*, locating pin 6 is extended through bore 308 of a workpiece 310, as shown in this view fingers 302 are in a retracted position. A clearly evident effect of this configuration is that the pin clamp does not need to extend so far upward in direction 56. (Compare FIG. 18*b* with FIG. 18*a*.) Illustratively, the centering portion 304 of split fingers 302 face wall surface 312 of bore 308. Once locating pin 6 is in this position, fingers 302 can move outward in directions 314 and 316. The centering portions 304 engage wall 312. This ensures centering of bore 308 illustratively with respect to locating pin 6. As shown in FIG. 18*d*, when locating pin 6 retracts further in direction 58, the clamping portions 306 which are shown to extend radially farther than centering portions 304, clamp down on workpiece 310.

Figure 19A:
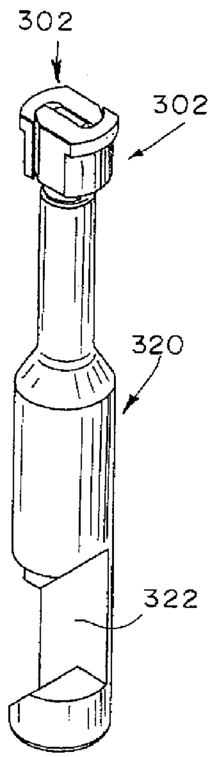
FIGS. 19*a-c* are perspective, perspective-exploded detail, and perspective/top/bottom/side views of the drive rod and alternate finger configuration for use in the pin clamp assembly.
Figure 19B:
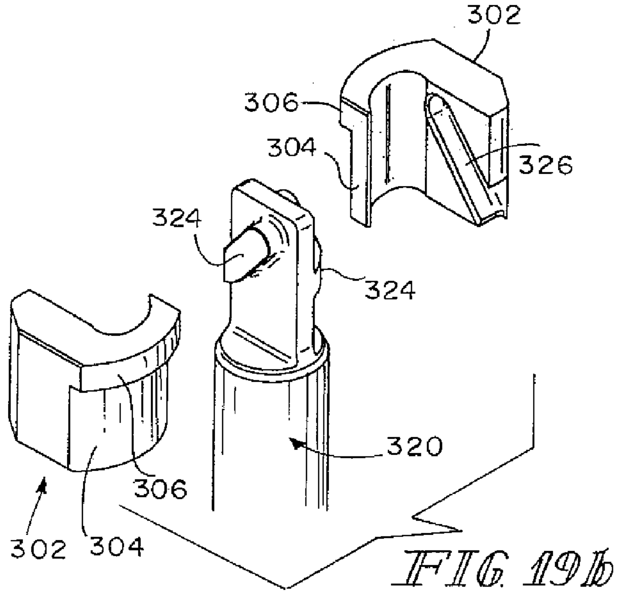
Figure 19C:
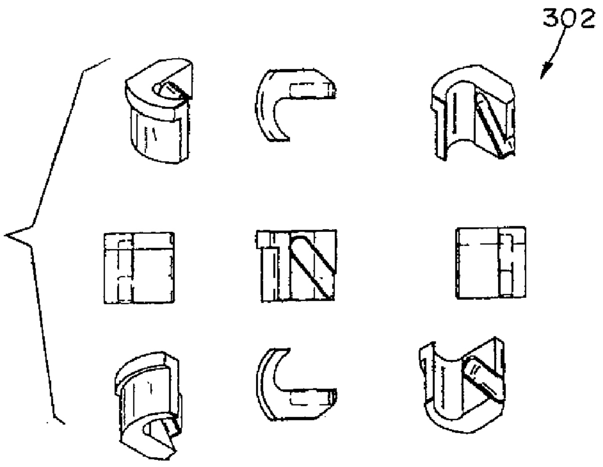

Several views of drive rod 320 and split fingers 302 are shown in FIGS. 19*a-c*. It is appreciated that drive rod 320 can be the same as drive rod 66 disclosed in the previous embodiments. Drive rod 320 may comprise a slot 322 similar to that of slot 84 and may have keys 324 similar to keys 92 of drive rod 66. (Compare with FIG. 8*a* and *b*.) These views, particularly in FIG. 19*c*, show the illustrative configuration of split finger 302. This illustrative embodiment shows finger 302 being similar to fingers 8 disclosed in previous embodiments, particularly slot 326 which is similar to slot 90 in the previous embodiments. It is appreciated, however, that the configuration of split fingers 302 can vary including separate components or structures for the centering and clamping portions.

Figure 20A:
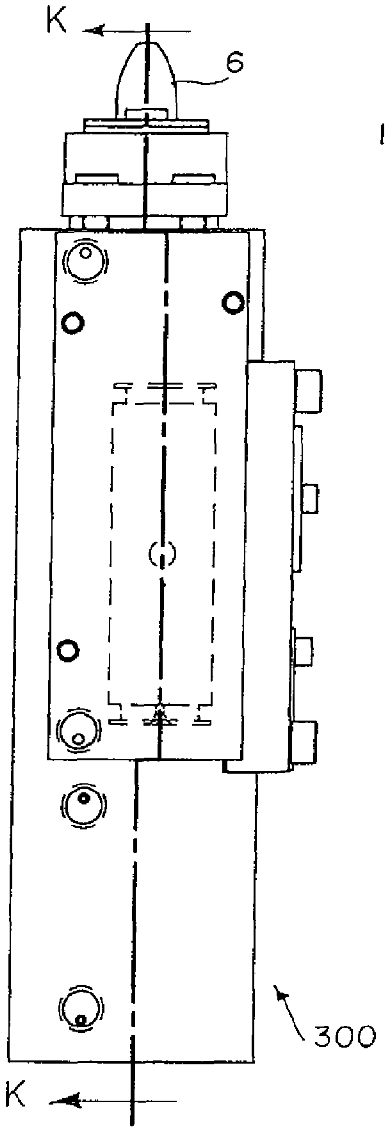
FIGS. 20*a* and *b* are end and side-cross-sectional views of a pin clamp assembly, wherein the sectional view of FIG. 20*b* is taken along lines K-K of FIG. 20*a;*
Figure 20B:
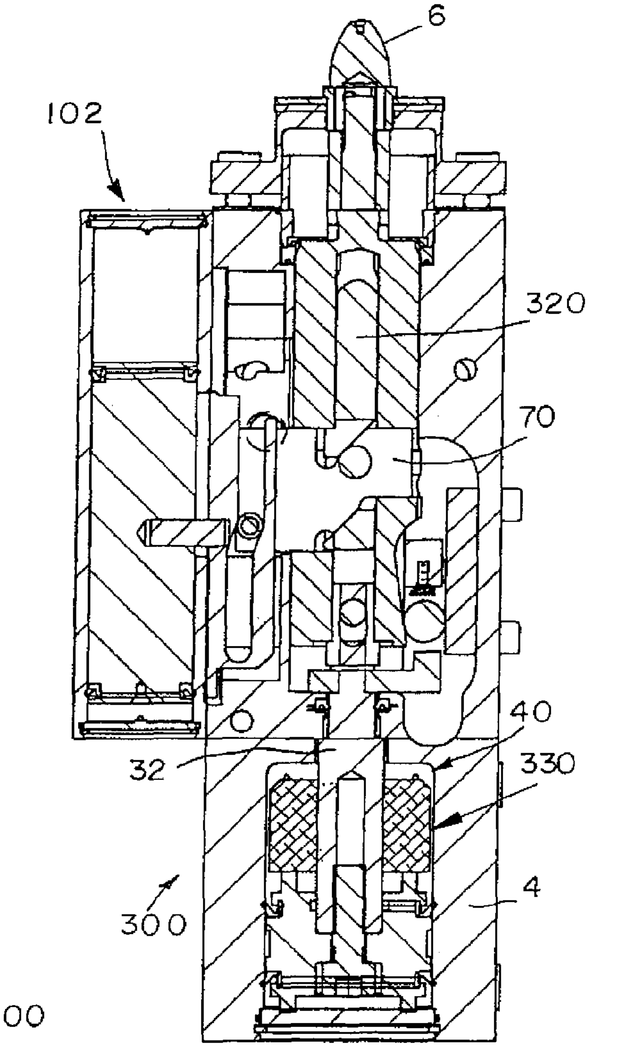

Front and side-cross-sectional views of pin clamp assembly 300 are shown in FIGS. 20*a* and *b*. The cross-sectional view shown in FIG. 20*b* is taken from lines G-G of FIG. 20*a*. In one illustrative embodiment, the movement of locating pin 6 can be adjusted by means of strip-off assembly 102, as described in previous embodiments. The strip-off assembly 102 can also be used to manipulate the movement of fingers 302 similar to that described with respect to fingers 8 in previous embodiments. It is appreciated that other mechanisms can be used to limit the stroke of locating pin 6, if so desired. An example of such is a reducer 330 shown herein that is located adjacent piston 46. As evident from the drawing, reducer 330 effectively limits the stroke or distance of travel available to piston rod 32 and ultimately locating pin 6. Other examples to reduce the stroke of locating pin 6 is possibly use a shorter piston rod in the clamp, or change the configuration of the body, or the bores within the body.

Figure 21:
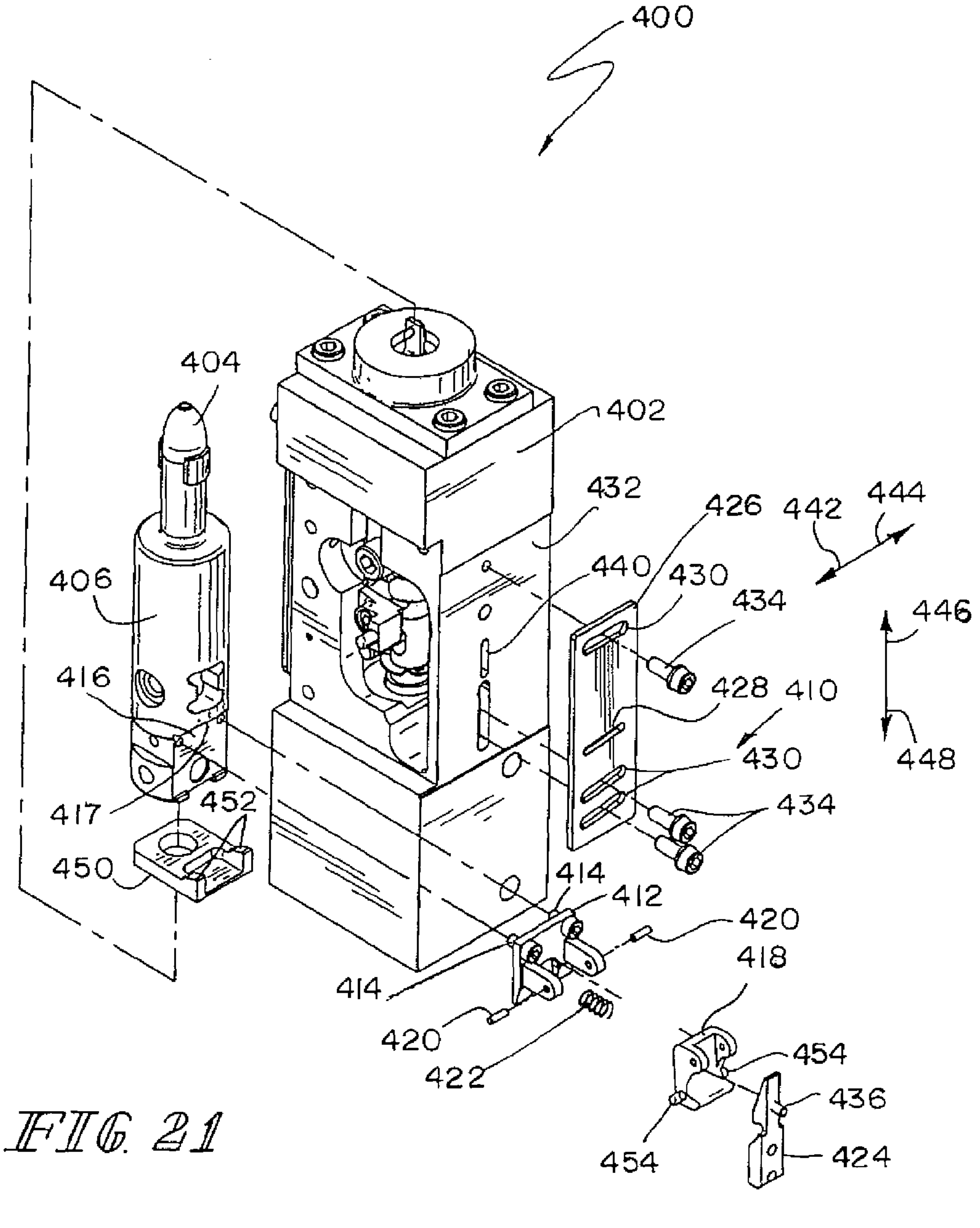
FIG. 21 is an exploded view of an illustrative embodiment of a pin clamp assembly comprising an illustrative embodiment of a lock assembly.

An exploded view of pin clamp assembly 400 is shown in FIG. 21. This assembly includes a housing 402, a locating pin 404, and a body 406. A lock assembly 410 is also shown. In this illustrative embodiment, lock assembly 410 comprises a hook mount 412 that attaches to body 406 via fasteners 414. A step 416 is illustratively formed on body 406 which forms a lip support 417. This illustrative mount configuration may assist removing shear loads from fasteners 414 that attach hook mount 412 to body 406. A hook 418 is mounted to hook mount 412 illustratively via dowels 420, thereby allowing hook 418 to pivot with respect to mount 412. Illustratively a compression spring 422 may be, employed to bias hook 418 outward from mount 412 and allow hook 418 to engage catch 424. In an illustrative embodiment, catch 424 is configured to slide up and down in directions 446 and 448 along housing 402 to accommodate clamped material of different thicknesses. An adjustment plate 426, having slots 428 and 430, is mounted in a pocket 432 via fasteners 434, as illustratively shown. Adjustment plate 426 is configured to slide laterally in directions 442 and 444 within pocket 432 by simply loosening fasteners 434. Catch 424 comprises a dowel 436 that extends therefrom and is disposed through slot 440 of housing 402, as well as angled slot 428 of adjustment plate 426. Lateral movement of adjustment plate 426 in directions 442 and 444 raise and lower catch 424 with respect to hook 418. This allows the assembly to accommodate clamped material of various thicknesses. Illustratively, engagement between slot 428 and dowel 436 may result in relatively precise movement of catch 424. This may translate into a more precise adjustment of catch 424 up and down in either direction 446 or 448. The engagement between dowel 436 and slot 428 may also transfer shear loads from catch 424 to housing 402 and plate 426.

An unlock bracket 450 illustratively comprising angled surfaces 452 is configured to engage hook 418 at pins 454. This engagement causes hook 418 to pivot on pins 420 and unlatch from catch 424. As previously described, piston rod 458 may be configured to move prior to movement of body 406. This means that unlock bracket 450, which may be coupled to piston rod 458, can move upward in direction 446, engage pins 454, and unlatch hook 418 from catch 424, before body 406 piston rod begins moving. It is appreciated that the contour of the hook and catch are configured to maintain a hold under loss of actuation force or if locating pin 404 is being pulled on. It is further appreciated that the contours and/or shapes of the hook and latch may be modified from that shown in this illustrative embodiment.

Figure 22A:
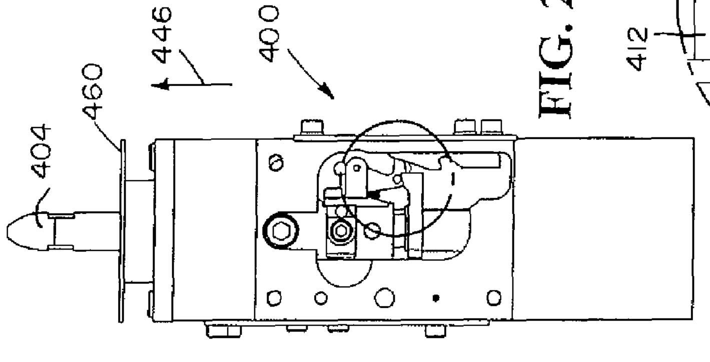
FIGS. 22*a-f* are side-interior and detail progression views of the pin clamp assembly and an associated lock assembly showing the process of locking the lock assembly.
Figure 22B:
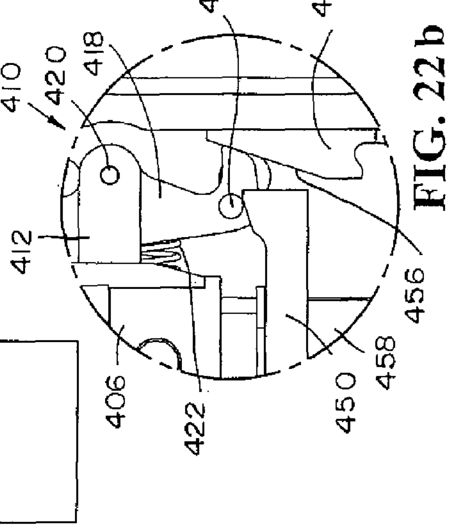
Figure 22C:
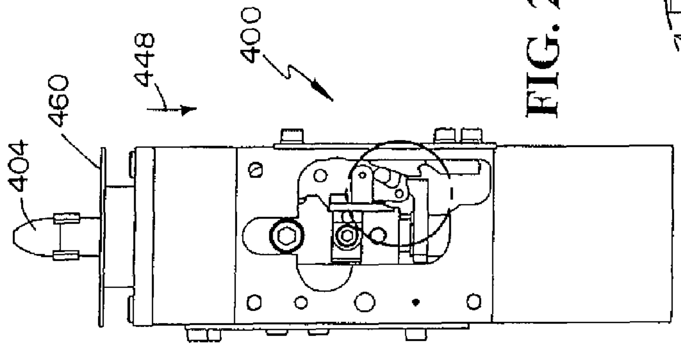
Figure 22D:
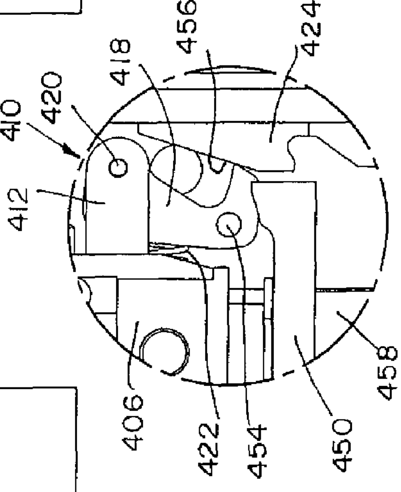
Figure 22E:
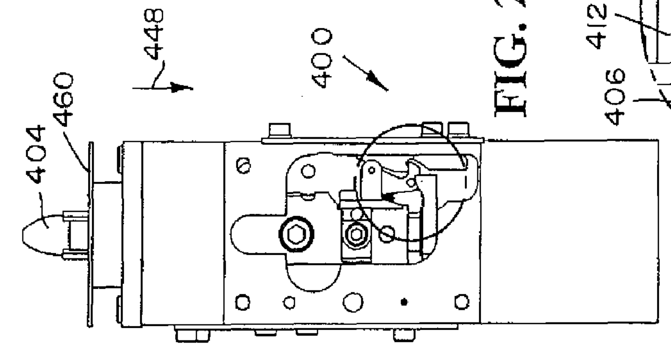
Figure 22F:
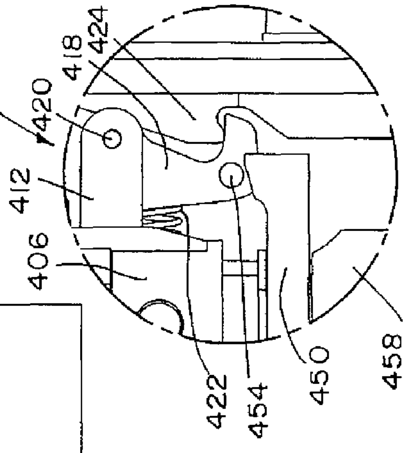

The progression views in FIGS. 22*a-f* show how lock assembly 410 works to lock locating pin 404. As shown in FIG. 22*a*, locating pin 404 is extended upward in direction 446 at its uppermost extent. Hook 418 is biased against angled surface 456 of catch 424 via compression spring 422, as shown in FIG. 22*b*. As locating pin 404 descends in direction 448, as shown in FIG. 22*c*, hook 418 continues to ride along sloped surface 456. The view in FIG. 22*d* shows piston rod 458 continuing to descend in direction 448 as well. When locating pin 404 is moved to its lower most extent and clamps onto a workpiece 460, hook 418 couples or latches with catch 424 to hold locating pin 404 in place as shown in FIG. 22*f*. It can be appreciated from this view that if locating pin 404 was attempted to be moved by an external source upward in direction 446, lock assembly 410 would prevent that movement from happening.

Figure 23A:
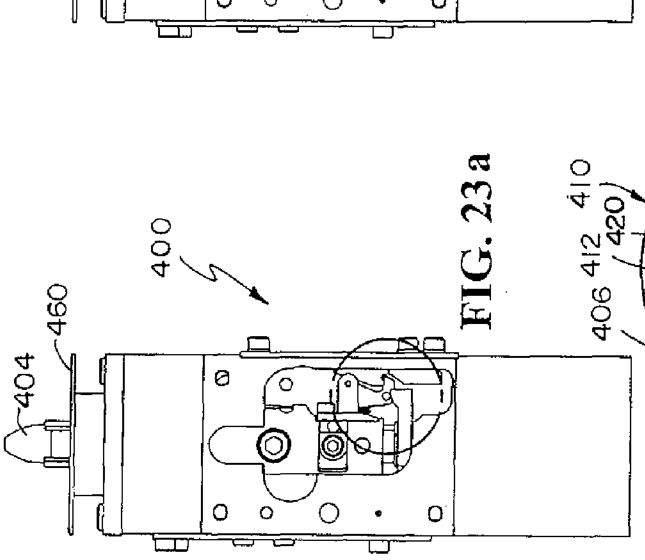
FIGS. 23*a-f* are side-interior and detail progression views of the pin clamp assembly and associated lock assembly showing the process of unlocking of the lock assembly.
Figure 23B:
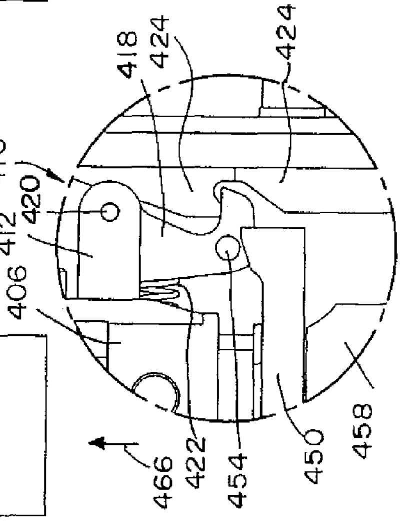
Figure 23C:
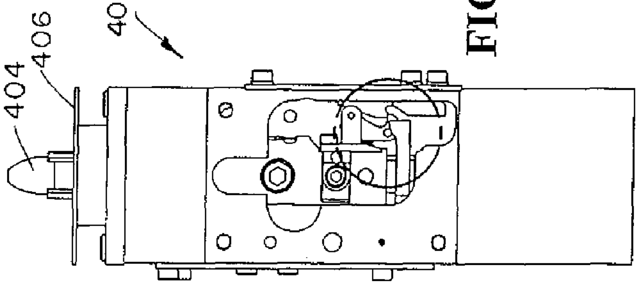
Figure 23D:
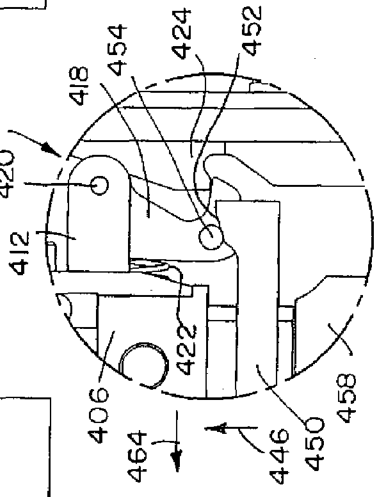
Figure 23E:
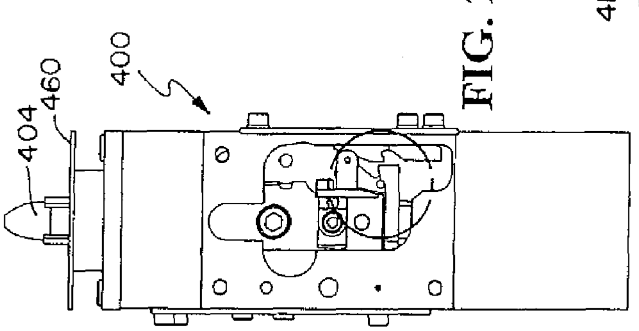
Figure 23F:
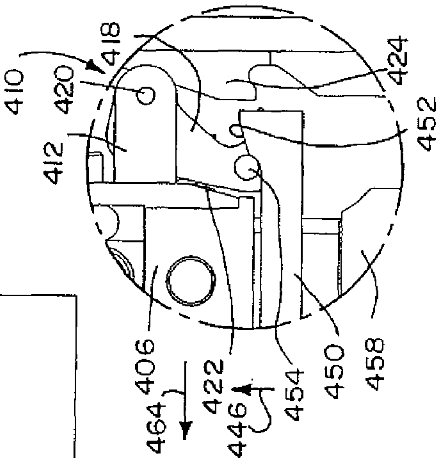

The progression views shown in FIGS. 23*a-f* demonstrate how lock assembly 410 is released to allow locating pin 404 to extend upward in direction 446. As shown in FIGS. 23*a* and *b*, with locating pin 404 clamped down against workpiece 460, piston rod 458 still moves upward in direction 446. It is notable that in this illustrative embodiment, locating pin 404 is not moved during the initial movement of piston rod 458. Design for this feature has been described in previous embodiments. Here, movement of piston rod 458 causes movement of unlock bracket 450 as well. As shown in FIGS. 23*c* and *d*, locating pin 404 still does not release workpiece 460, yet surfaces 452 of unlock bracket 450 engage pin 454 of hook 418. Surfaces 452 are angled so that the upward movement of unlock bracket 450 draws hook assembly 418 inward in direction 464 against the bias of compression spring 422. The configuration of hook 418 and catch 424 causes hook 418 to begin unlatching by pivoting about dowels 420. The continued movement of piston rod 458 upward in direction 446 continues to cause unlock bracket 450 to unlatch from hook 418 and catch 424, as shown in FIG. 23*f*. At this position, locating pin 404 has still not released workpiece 460 as shown in FIG. 23*e*. Nevertheless, hook 418 has cleared catch 424 which allows locating pin 404 to freely move upward in direction 446 via piston rod 458, to release workpiece 460.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A pin clamp assembly for holding a workpiece, the pin clamp assembly comprising a movable locating pin with a finger that is extendable therefrom, a housing that receives a portion of the locating pin and has a workpiece support adjacent the extended finger, and a lock assembly which comprises a hook and a catch that selectively engages and holds each other to restrict movement of the locating pin, and further comprising an unlock bracket; wherein the unlock bracket includes an angled surface configured to engage a pin extending from the hook to cause the hook to pivot and unlatch from the catch; the hook and catch are configured to maintain a hold with each other under loss of actuation force, or if the locating pin is pulled on; wherein the hook and catch are further configured such that the hook, using a spring, is biased against an angled surface of the catch as the locating pin moves in a first direction; wherein as the locating pin continues to move in the first direction, the hook latches with the catch to hold the locating pin in place; to release the lock assembly, the unlock bracket is movable in a second direction such that a surface on the unlock bracket engages a pin coupled with the hook; movement of the unlock bracket in the second direction pivots the hook against the bias of the spring; wherein pivoting of the hook begins unlatching it from the catch; continued movement of the unlock bracket unlatches the hook from the catch.

2. The pin clamp assembly of claim 1, wherein the catch is selectively adjustable relative to the housing.

3. The pin clamp assembly of claim 1, further comprising an actuator that moves the locating pin.

* * * * *